US012076848B2

(12) United States Patent
Li

(10) Patent No.: US 12,076,848 B2
(45) Date of Patent: Sep. 3, 2024

(54) WORKBENCH AND WORKBENCH MODULE

(71) Applicants: HANGZHOU UNITED TOOLS CO., LTD., Hangzhou (CN); HANGZHOU GREAT STAR INDUSTRIAL CO., LTD., Hangzhou (CN)

(72) Inventor: Jingjian Li, Hangzhou (CN)

(73) Assignees: HANGZHOU UNITED TOOLS CO., LTD., Hangzhou (CN); HANGZHOU GREAT STAR INDUSTRIAL CO., LTD., Hangzhou (CN)

( * ) Notice: Subject to any disclaimer, the term of this patent is extended or adjusted under 35 U.S.C. 154(b) by 625 days.

(21) Appl. No.: 17/299,756

(22) PCT Filed: Mar. 22, 2021

(86) PCT No.: PCT/CN2021/082055
§ 371 (c)(1),
(2) Date: Jun. 3, 2021

(87) PCT Pub. No.: WO2022/198375
PCT Pub. Date: Sep. 29, 2022

(65) Prior Publication Data

US 2023/0347497 A1 Nov. 2, 2023

(51) Int. Cl.

| | |
|---|---|
| ***B25H 1/08*** | (2006.01) |
| ***B25B 11/00*** | (2006.01) |
| ***B25H 1/04*** | (2006.01) |
| ***B25H 1/16*** | (2006.01) |

(52) U.S. Cl.
CPC ................ *B25H 1/08* (2013.01); *B25B 11/00* (2013.01); *B25H 1/04* (2013.01); *B25H 1/16* (2013.01)

(58) Field of Classification Search
CPC ... B25H 1/08; B25H 1/10; B25H 1/12; B25H 1/02; B25H 1/04
See application file for complete search history.

(56) References Cited

U.S. PATENT DOCUMENTS

| | | | | |
|---|---|---|---|---|
| 4,555,099 A * | 11/1985 | Hilton | ...................... | B25H 1/08 269/208 |
| 7,418,907 B2 * | 9/2008 | Haimoff | .................. | B25H 1/04 108/115 |
| 2017/0173778 A1 | 6/2017 | Reinhart | | |

FOREIGN PATENT DOCUMENTS

| | | | |
|---|---|---|---|
| AU | 2850695 A | | 2/1997 |
| CN | 205184712 U | * | 4/2016 |
| CN | 208084294 U | * | 11/2018 |
| CN | 212706666 U | | 3/2021 |

OTHER PUBLICATIONS

The WORX Pegasus Folding Work Table Review. The Awesome Orange. https://www.theawesomeorange.com/blog/worx-pegasus-review (Jan. 16, 2019) (Year: 2019).*
International Search Report of PCT/CN2021/082055.

* cited by examiner

*Primary Examiner* — Tyrone V Hall, Jr.

(57) ABSTRACT

The present disclosure provides a workbench and a workbench module. The workbench includes an operating portion being configured for a user to process an external object. An first accommodating groove is disposed on the operating portion, and a rod of a fixture can be detachably fixed in the first accommodating groove by the workbench.

28 Claims, 19 Drawing Sheets

WORKBENCH AND WORKBENCH MODULE

CROSS REFERENCE TO RELATED APPLICATIONS

This application is a National Stage application of international application No. PCT/CN2021/082055 filed on Mar. 22, 2021, and titled "WORKBENCH AND WORKBENCH MODULE" in the China National Intellectual Property Administration, the content of which is hereby incorporated by reference.

TECHNICAL FIELD

The present disclosure relates to a workbench, in particular, to a workbench module.

BACKGROUND

A workbench is usually matched with a fixture to clamp and fix an external object. The fixture includes a rod, a fixed fixture body and a movable fixture body. The fixed fixture body is fixed to the rod, and the movable fixture body can move along the rod.

When a conventional workbench is used with the fixture, a T-shaped chute is located on an operating surface of the workbench to fix the movable fixture body of the fixture to one side of the workbench. The fixed fixture body and the rod can slide in the chute, thereby clamping the external object.

However, this type of matching does not satisfy a user's work habits. During use, if a part of the rod that does not enter the chute is subjected to a large force, the fixture is prone to roll over, and the rod and the fixed fixture body can easily separate from the chute, which affect normal use. In addition, the rod of the fixture is exposed to the outside, which is susceptible to friction from objects to be processed such as wood, affecting the service life of the fixture. In addition, the rod moving relative to the workbench may bring safety hazards.

SUMMARY

In view of above, it is necessary to provide a workbench and a workbench module.

In the present disclosure, a workbench is provided. The workbench includes an operating portion configured for a user to process an external object, wherein the operating portion includes a first accommodating groove, and the first accommodating groove is configured for detachably fixing a rod of a fixture.

In some embodiments, the workbench includes a first locating portion, which inserts into the first accommodating groove and is configured for limiting the rod to move in the first accommodating groove.

In some embodiments, the workbench includes a first mounting hole penetrating through the first accommodating groove. The first locating portion includes a locating pin, which is able to move in the first mounting hole and insert into a locating hole of the rod.

In some embodiments, the first locating portion further includes a first elastic member configured for applying an elastic force on the locating pin, resulting in the locating pin extending into and remaining in the locating hole.

In some embodiments, the first locating portion further includes a limiting sheet, which is sleeved on and fixed to the locating pin. The first elastic member is sleeved on the locating pin, and two ends of the first elastic member abuts against the limiting sheet and the operating portion, respectively.

In some embodiments, the first locating portion further includes an operating member. The operating member is movably connected to an end away from the first accommodating groove of the locating pin. A first groove is located on a sidewall of the workbench, and the first groove is configured for accommodating the operating member.

In some embodiments, the workbench includes the first mounting hole penetrating through the first accommodating groove. The first locating portion includes a first pressing member, a second pressing member and a third elastic member. The first pressing member and the second pressing member are fixed to each other, and are accommodated in the first mounting hole. Two ends of the third elastic member abuts against the first pressing member and the workbench, respectively, a locating column is disposed on the second pressing member, and a mounting gap is formed between the locating column and the first pressing member.

In some embodiments, the first pressing member is configured for driving the second pressing member to move, resulting in the mounting gap moving to the first accommodating groove for the rod to insert in.

In some embodiments, a part of the locating column inserts in the locating hole of the rod under an elastic effect of the third elastic member, resulting in the rod being detachably fixed in the first mounting hole.

In some embodiments, the first pressing member is provided with a connecting member, and the first pressing member is fixed to the second pressing member via the connecting member. The operating portion includes an arc-shaped groove, the first pressing member is able to rotate and drive the connecting member to rotate in the arc-shaped groove to prevent collisions with the rod.

In some embodiments, the operating portion includes an operating surface configured for placing the external object. A distance is defined between a side near the operating surface of the first accommodating groove and the operating surface.

In some embodiments, a second groove is located on a sidewall of the operating portion, and the second groove is configured for accommodating a movable fixture body of the fixture.

In some embodiments, the workbench further includes a fixing member including a third clamping surface, and the fixing member is disposed on the operating portion. The third clamping surface of the fixing member can cooperate with a second clamping surface of a movable fixture body of the fixture to clamp the external member.

In some embodiments, a mounting member is disposed on the fixing member and protrudes out from the fixing member. A second mounting hole is defined on the operating portion, and the mounting member is able to insert into the second mounting hole.

In some embodiments, a plurality of second mounting holes are defined on the operating portion, and the plurality of second mounting holes are divided into two sets. The two sets of the plurality of second mounting holes are located at two sides of the first accommodating groove, respectively.

The two sets of second mounting holes are aligned in pairs with the first accommodating groove as a center line, respectively. A line defined by two corresponding second mounting holes in a pair is perpendicular to an axis of the first accommodating groove; and/or, the second mounting holes in each of the two sets are evenly distributed along the axis of the first accommodating groove.

In some embodiments, two mounting members are disposed on the fixing member and protrude from the fixing member, and the two mounting members inserts into two of the plurality of second mounting holes on two sides of the first accommodating groove, respectively.

In some embodiments, one mounting member is disposed on the fixing member and protrudes from the fixing member, and the workbench further includes two fixing members inserting into two of the plurality of second mounting holes, respectively.

In some embodiments, in each of the two sets of the plurality of second mounting holes, a distance between two adjacent second mounting holes of the plurality of second mounting holes is less than or equal to a depth of the second groove.

In some embodiments, the workbench includes the first locating portion configured for detachably fixing the rod to the second mounting hole, and the operating surface of the workbench is perpendicular to the rod. The operating surface of the workbench is able to cooperate with the movable fixture body of the fixture to clamp the external object.

In some embodiments, the workbench further includes a supporting portion configured for supporting the operating portion. An accommodating hole is defined on the supporting portion, and the fixing member is able to insert into the accommodating hole via the mounting member.

In some embodiments, the operating portion includes a folding portion and a fixing portion, and the folding portion is rotatably connected to the fixing portion.

In some embodiments, the folding portion includes a first folding portion and a second folding portion. The first folding portion and the second folding portion are disposed at two sides of the fixing portion, respectively, and able to fold relative to the fixing portion, respectively.

In some embodiments, the workbench further includes the supporting portion connected to the fixing portion and configured for supporting the fixing portion.

The workbench further includes two supporting members. The two supporting members are rotatably connected to the supporting portion, and the two supporting members are configured for supporting the first folding portion and the second folding portion, respectively. The supporting portion includes a first frame body and a second frame body, and both the first frame body and the second frame body are rotatably connected to the fixing portion.

In some embodiments, the operating portion further includes a first locking member, which is disposed on a side near the supporting portion of the first folding portion and/or a side near the supporting portion of the second folding portion. The first locking member is configured for fixing the supporting member to the first folding portion or the second folding portion.

In some embodiments, the first locking member includes a mounting portion and a first locking portion. The mounting portion is fixed to the first folding portion or the second folding portion. The first locking portion is movably connected to the mounting portion, and the first locking portion is configured for locking the supporting member between the first folding portion and the first locking portion or between the second folding portion and the first locking portion.

In some embodiments, the operating portion includes the operating surface and a back surface separated from each other. A second accommodating groove is defined on the back surface. The supporting member is a U-shaped rod, and two ends of the U-shaped rod are pivotally connected to the supporting portion, respectively. The second accommodating groove is able to accommodate and limit the supporting member, and a middle section of the U-shaped rod is configured for contacting with and supporting the first folding portion and the second folding portion.

In some embodiments, the supporting portion comprises a first frame body and a second frame body, and both the first frame body and the second frame body are rotatably connected to the fixing portion; both the first frame body and the second frame body are provided with a mounting frame, and the supporting member is rotatably disposed on the mounting frame. When the first folding portion and/or the second folding portion is in a folding state, a gap is defined between the first folding portion and the mounting frame and/or between the second folding portion and the mounting frame.

In some embodiments, the supporting portion comprises the first frame body and the second frame body, and both the first frame body and the second frame body are rotatably connected to the fixing portion; both the first frame body and the second frame body include a connecting rod and two supporting rods, and the connecting rod is configured for connecting the two supporting rods. The connecting rod includes a hook portion, and the hook portion is configured for clipping the middle section of the U-shaped rod to prevent the supporting member from rotating towards a direction away from the connecting rod.

In some embodiments, the first frame body comprises two the supporting rods, and both of the two supporting rods are telescopic rods.

In some embodiments, the second frame body comprises two the supporting rods, and both of the two supporting rods are telescopic rods.

In some embodiments, the supporting portion comprises the first frame body and the second frame body, and both the first frame body and the second frame body are rotatably connected to the fixing portion.

In some embodiments, both the first frame body and the second frame body include a connecting rod and two supporting rods, the connecting rod is configured for connecting the two supporting rods; the supporting portion further includes a first foldable plate and a second foldable plate, a side away from the second foldable plate of the first foldable plate is rotatably connected to the connecting rod of the first frame body, a side away from the first foldable plate of the second foldable plate is rotatably connected to the connecting rod of the second frame body, and the first foldable plate is rotatably connected to the second foldable plate.

In some embodiments, both the first foldable plate and the second foldable plate include a plurality of axle pin plates and a plurality of axle sleeve plates, which are staggered with each other, the axle pin plate is provided with a pin axle, and the axle sleeve plate is provided with an axle sleeve matching with the pin axle.

In some embodiments, the pin axle of the first foldable plate is disposed in the axle sleeve of the second foldable plate, and the pin axle of the second foldable plate is disposed in the axle sleeve of the first foldable plate, resulting in forming a rotatable connection between the first foldable plate and the second foldable plate.

In some embodiments, a limiting member is disposed on and protrudes from the pin axle plate, and a limiting hole is defined on the axle sleeve plate, and the limiting member is latched in the limiting hole.

In some embodiments, both the first foldable plate and the second foldable plate includes a peripheral plate, which is located around the axle pin plate and the axle sleeve plate. The peripheral plate of the first foldable plate is provided with a stopper, and the peripheral plate of the second foldable plate is provided with a limiting groove. Alternatively, the peripheral plate of the second foldable plate is provided with the stopper, and the peripheral plate of the first foldable plate is provided with the limiting groove. The limiting groove is configured for accommodating and limiting the stopper, so as to limit a rotation angle defined between the first foldable plate and the second foldable plate.

In some embodiments, a third mounting hole is defined on the operating portion, the workbench is able to fix the rod to the third mounting hole, and a first preset angle is defined by the operating surface of the workbench and the rod. The operating surface of the workbench and the movable fixture body of the fixture cooperate with each other to clamp the external object.

In some embodiments, a shape of the third mounting hole matches with a shape of a cross-section of the rod, and the rod is perpendicular to the operating surface.

In some embodiments, a first mounting hole is defined on the workbench, the workbench includes a first locating portion, and the first mounting hole penetrates through the third mounting hole. The first locating portion is movably disposed in the first mounting hole, and the first locating portion is able to insert into the third mounting hole and prevent the rod from moving.

In some embodiments, the first accommodating groove, the third mounting hole and the first mounting hole communicates with each other, and an axis of the first accommodating groove is perpendicular to an axis of the third mounting hole and the axis of the first mounting hole, and the axis of the third mounting hole is perpendicular to an axis of the first accommodating groove and the axis of the first mounting hole, and the axis of the first mounting hole is perpendicular to the axis of the first accommodating groove and the axis of the third mounting hole; and, the first locating portion is configured for detachably fixing the rod to the first accommodating groove or the third mounting hole.

In the present disclosure, a workbench module is further provided. The workbench module includes the workbench stated above and the fixture, wherein the fixture includes the rod and a movable fixture body. The rod is able to be detachably fixed to the workbench, and the movable fixture body is able to move along the rod In some embodiments, the fixture is an F-shaped fixture; and/or, the workbench is a carpenter's workbench.

In the present disclosure, a workbench is configured for detachably fixing a rod in an accommodating groove to prevent an object to be processed from rubbing against the rod, thereby prolonging a service life of a fixture. In the present disclosure, the workbench improves stability of the fixture, so that the fixture will not roll over during use. Moreover, since the rod is fixed to the workbench, safety hazards caused by moving the rod can be decreased. In addition, a user can clamp the external object by merely handling a movable fixture body of the fixture, which is convenient for the user.

Figure 1:
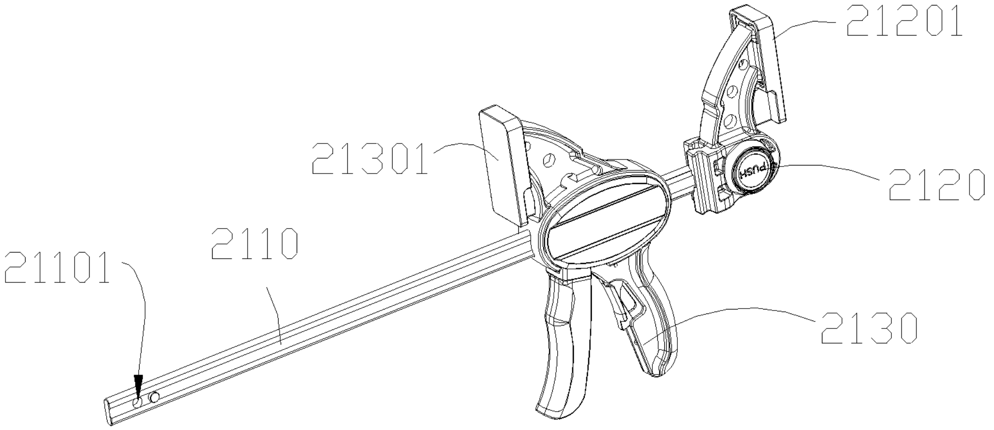
FIG. 1 is a structural schematic diagram of a fixture of an embodiment of the present disclosure.

In the figures, 100 represents an workbench; 10 represents an operating portion; 101 represents a first folding portion; 1011 represents a second groove; 102 represents a second folding portion; 103 represents a fixing portion; 104 represents an operating surface; 105 represents a back surface;

1051 represents a second accommodating groove; 106 represents a first groove; 11 represents an first accommodating groove; 12 represents a first locating portion; 121 represents a locating pin; 122 represents a first elastic member; 123 represents a limiting sheet; 124 represents an operating member; 13 represents a first mounting hole; 14 represents a second mounting hole; 15 represents a third mounting hole; 171 represents a first pressing member; 1711 represents a connecting member; 172 represents a second pressing member; 1721 represents a locating column; 173 represents a third elastic member; 174 represents a mounting gap; 18 represents an arc-shaped groove; 20 represents a supporting portion; 21 represents a first frame body; 211 represents a mounting frame; 212 represents a supporting rod; 2121 represents an outer rod; 2122 represents an inner rod; 21221 represents a locking hole; 21222 represents a mat; 213 represents a connecting rod; 2131 represents an accommodating hole; 2132 represents a chute; 214 represents a hook portion; 215 represents a second locking member; 2151 represents a second locking portion; 2152 represents a pushing portion; 216 represents a second elastic member; 22 represents a second frame body; 23 represents a first foldable plate; 231 represents an axle pin plate; 2311 represents a pin axle; 2312 represents a limiting member; 232 represents an axle sleeve plate; 2321 represents an axle sleeve; 2322 represents a limiting hole; 233 represents a peripheral plate; 2331 represents a stopper; 2332 represents a limiting groove; 24 represents a second foldable plate; 30 represents a supporting member; 31 represents a middle section; 40 represents a first locking member; 41 represents a mounting portion; 42 represents a first locking portion; 50 represents a fixing member; 51 represents a third clamping surface; 52 represents a mounting member; 200 represents a workbench module; 210 represents a fixture; 2110 represents a rod; 21101 represents a locating hole; 2120 represents a fixed fixture body; 21201 represents a first clamping surface; 2130 represents a movable fixture body; 21301 represents a second clamping surface; 300 represents an external object.

DETAILED DESCRIPTION

The technical solutions in the embodiments of the present disclosure will be clearly and completely described below in conjunction with the drawings in the embodiments of the present disclosure. Obviously, the described implementations are only a part of the implementations of the present disclosure, rather than all of the implementations. Based on the implementation manners in this disclosure, all other implementation manners obtained by one of ordinary skill in the art without creative work shall fall within the protection scope of this disclosure.

It should be noted that when a component is referred to as being "connected to" another component, it can be directly connected to the other component or to the other component via another component. When a component is considered to be "disposed on" another component, it can be directly disposed on another component or on the other component via another component. When a component is considered "fixed" to another component, it can be directly fixed to the other component or to the other component via another component.

Unless otherwise defined, all technical and scientific terms used herein have the same meaning as commonly understood by those skilled in the technical field of this disclosure. The terminology used in the specification of the disclosure herein is only for the purpose of describing specific embodiments, and is not intended to limit the disclosure. The term "or/and" as used herein includes any and all combinations of one or more related listed items.

Figure 2:
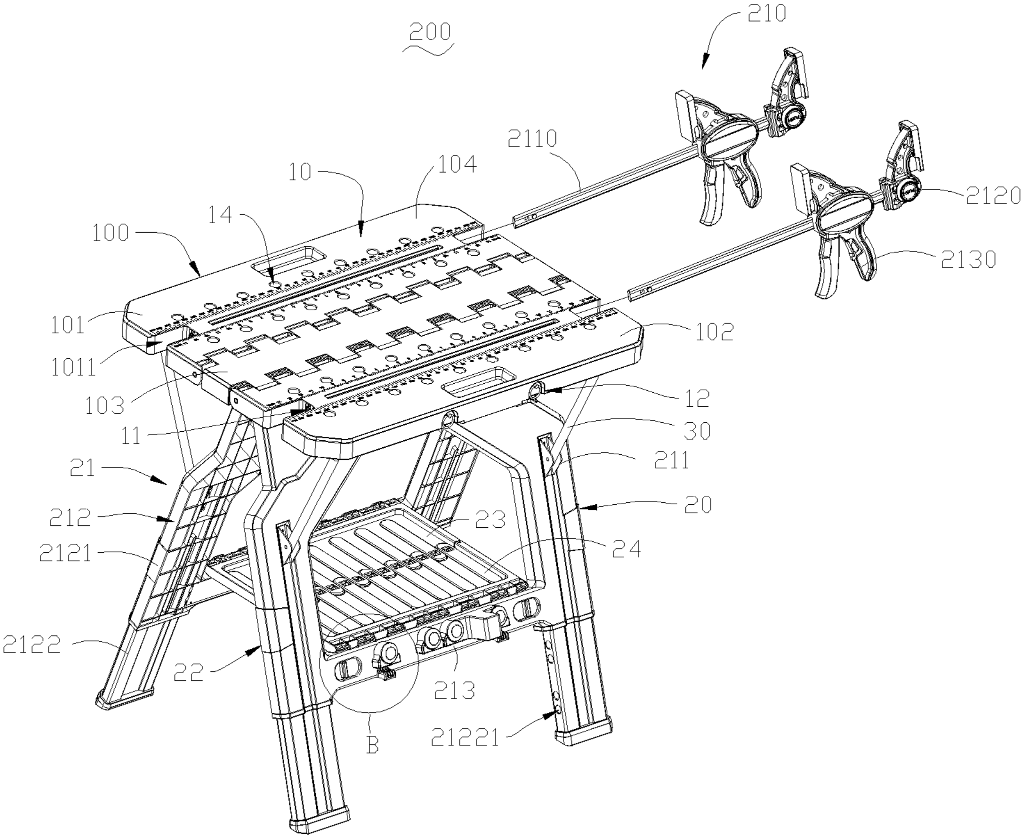
FIG. 2 is a structural schematic diagram of a workbench module in a first embodiment of the present disclosure.

Referring to FIG. 1 and FIG. 2, the present disclosure provides a workbench module 200 and a workbench 100. The workbench module 200 can include the workbench 100 and a fixture 210. The workbench module 200 can be configured for fixing an external object 300 and facilitating to process the external object. In the present embodiment, the workbench module 200 can be used in a field of woodworking. It should be understood that in other embodiments, the workbench module 200 can further be used in other workplaces needing to clamp an object, such as family, industry and the like.

FIG. 1 is a structural schematic diagram of a fixture 210 in an embodiment of the present disclosure. The fixture 210 can include a rod 2110, a fixed fixture body 2120 and a movable fixture body 2130. At least one locating hole 21101 is located on the rod 2110. The fixed fixture body 2120 is fixed to the rod 2110 via the locating hole 21101, and the movable fixture body 2130 can be sleeved on the rod 2110 and move along the rod 2110 under driven by a user. The fixed fixture body 2120 can include a first clamping surface 21201, and the movable fixture body 2130 can include a second clamping surface 21301. The first clamping surface 21201 and the second clamping surface 21301 can cooperate with each other to clamp the external object 300.

In some embodiments, the locating hole 21101 can be located on both ends of the rod 2110, to improve applicability of the fixture 210. Furthermore, the fixed fixture body 2120 can be detachably disposed on the locating hole 21101.

Furthermore, the movable fixture body 2130 can include a third pressing member (not shown in the figures) and a fourth pressing member (not shown in the figures). When the user presses the third pressing member, the movable fixture body 2130 can reciprocate along the rod 2110. When the user presses the fourth pressing member, the movable fixture body 2130 can apply a clamp force to an object to be clamped. A locking device (not shown in the figures) can be configured for remaining the fixture in a clamping state. After using, the user can press the third pressing member again to release the clamping state. It should be understood that the fixture 210 of the present disclosure can be other conventional fixtures 210, which will not be described in detail herein.

In some embodiments, the fixture 210 in the present disclosure can be an F-shaped fixture.

In conventional art, when the workbench cooperates with the fixture, a T-shaped chute is located on an operating surface of the workbench to fix the movable fixture body of the fixture to one side of the workbench. The fixed fixture body and the rod can slide in the chute, thereby clamping the external object (e.g., a structure shown in Chinese patent No. CN104249315B). However, when a force applied on the fixture is uneven, the rod is prone to roll over around the movable fixture body as a rotation center, resulting in the rod separating from the chute. Moreover, the rod of the fixture is exposed to the outside, which is susceptible to friction from the objects to be processed such as wood, affecting the service life of the fixture. During use, the rod moving relative to the workbench will bring safety hazards. When using the workbench, the user should continuously pay attention to avoiding collisions of the rod, which will affect the clamping efficiency.

Figure 8:
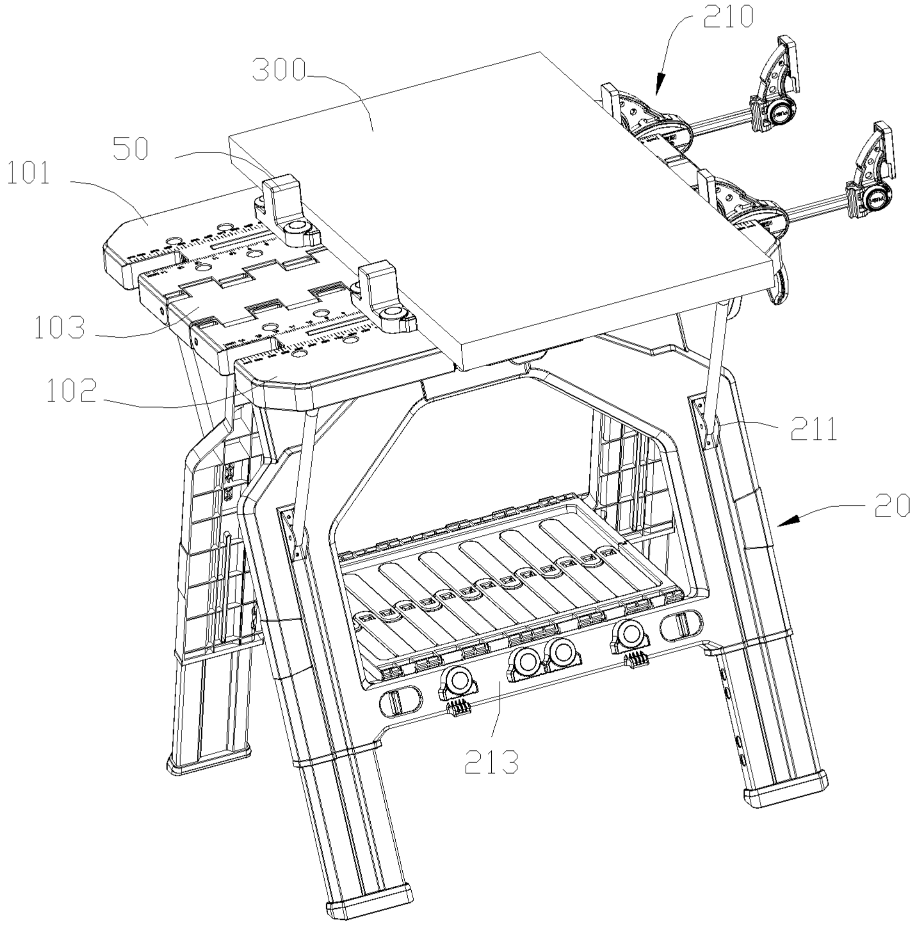
FIG. 8 is a schematic diagram of the workbench module in the first embodiment of the present disclosure, which is used in a first scenario.
Figure 9:
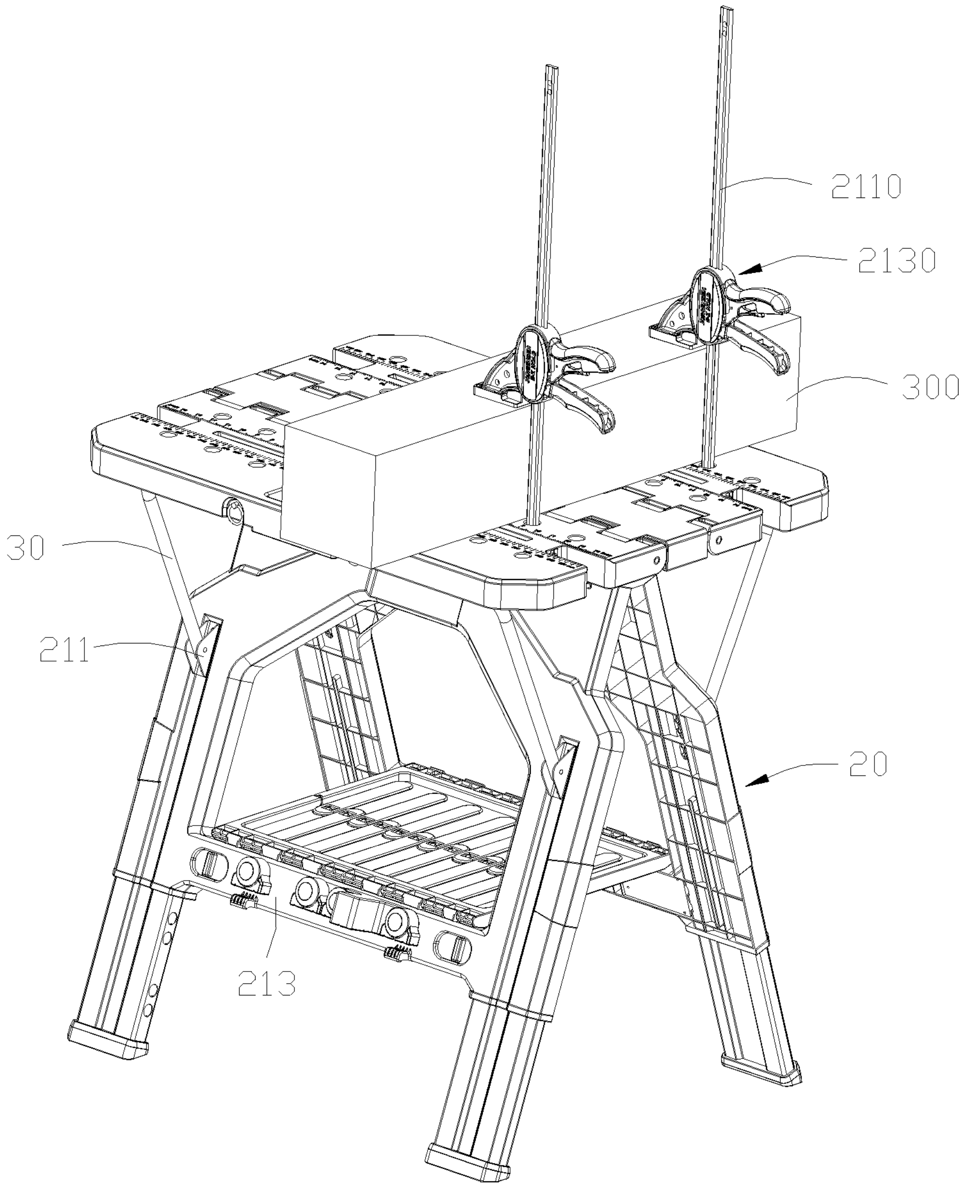
FIG. 9 is a schematic diagram of the workbench module in the first embodiment of the present disclosure, which is used in a second scenario.
Figure 10:
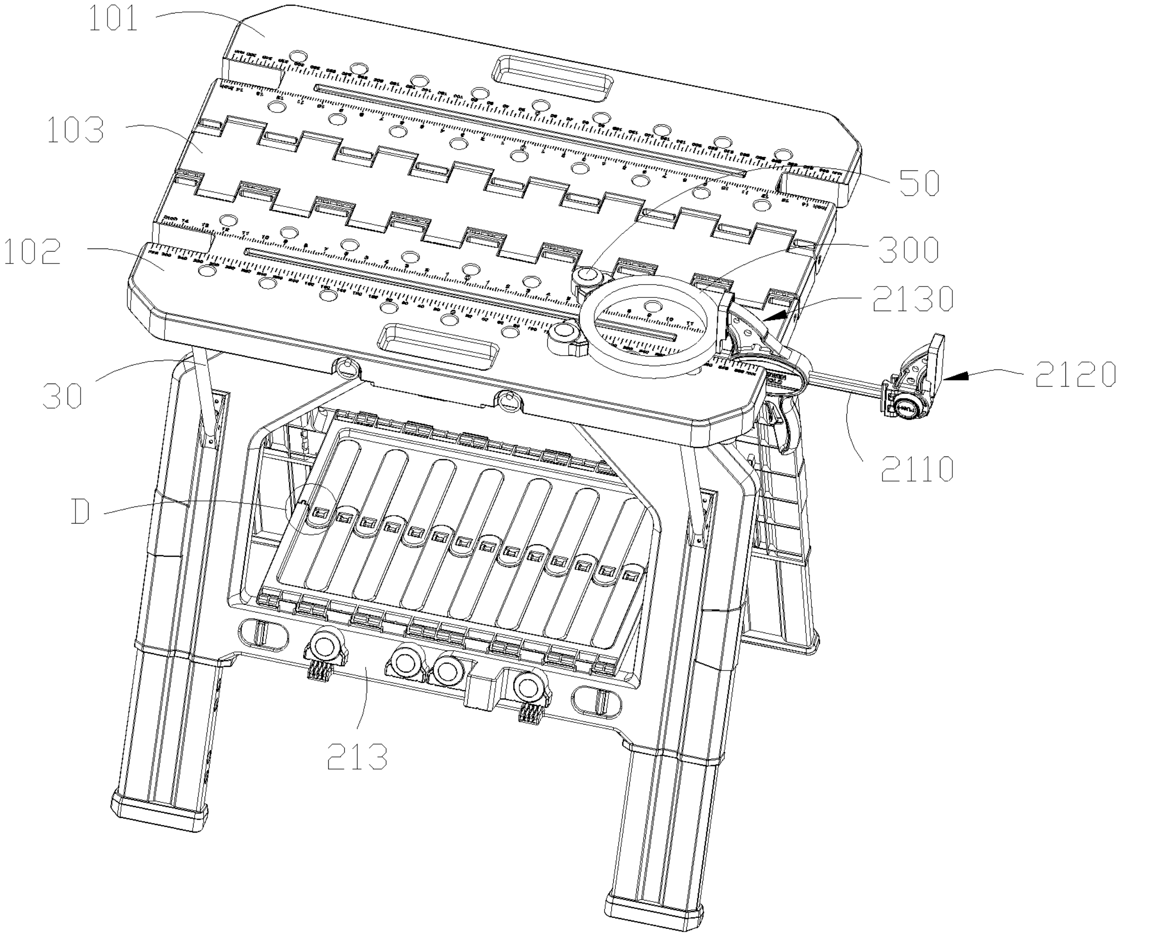
FIG. 10 is a schematic diagram of the workbench module in the first embodiment of the present disclosure, which is used in a third scenario.

Referring to FIG. 2, and referring to FIG. 8 to FIG. 10. FIG. 2 is a structural schematic diagram of a workbench module in a first embodiment of the present disclosure. FIG. 8 to FIG. 10 are schematic diagrams of the workbench module in the first embodiment of the present disclosure, which are being used in different scenarios.

In the present disclosure, the workbench 100 can include an operating portion 10 being configured for a user to process an external object 300, wherein the operating portion 10 can include a first accommodating groove 11. The rod 2110 of the fixture 210 can insert into the first accommodating groove 11. The first accommodating groove 11 can be configured for detachably fixing the rod 2110 of the fixture 210. The workbench 100 and the movable fixture body 2130 of the fixture 210 can cooperate with each other to clamp the external object 300. Alternatively, two movable fixture bodies 2130 of two fixtures 210 can cooperate with each other to clamp the external object 300. Therefore, the workbench 100 can detachably dispose the rod 2110 of the fixture 210 in the first accommodating groove 11, thereby improving stability of the fixture 210 and preventing rollover of the fixture 210 during use. Moreover, since the rod 2110 is fixed to the workbench 100, safety hazards caused by moving the rod 2110 can be reduced. In addition, the user can clamp the external object 300 conveniently by merely handling the movable fixture body 2130 of the fixture 210.

In the present disclosure, the workbench 100 can be a carpenter's workbench, a sawhorse, and the like.

In some embodiments, a second groove 1011 of the movable fixture body 2130 can be located on a sidewall of the operating portion 10. The second groove 1011 not only can be configured for preventing the fixture 210 excessively protruding out from the workbench module 200 and influencing operation of the user, but also can be configured for limiting the movable fixture body 2130 and avoiding movement of the movable fixture body 2130. It should be understood that in some embodiments (not shown in the present disclosure), if not considering influence caused by the movable fixture body 2130 protruding out from the operating portion 10, the operating portion 10 can be provided without the second groove 1011, and the movable fixture body 2130 can protrude out from the operating portion 10 after assembly.

The operating portion 10 can include an operating surface 104 configured for placing the external object 300. A distance can be defined between a side near the operating surface 104 of the first accommodating groove 11 and the operating surface 104. That is, the first accommodating groove 11 can be located inside the operating portion 10, and a peripheral wall of the first accommodating groove 11 can protect the rod 2110 from exposing to the outside, thereby preventing the external object 300 from contacting and damaging the rod 2110.

Figure 3:
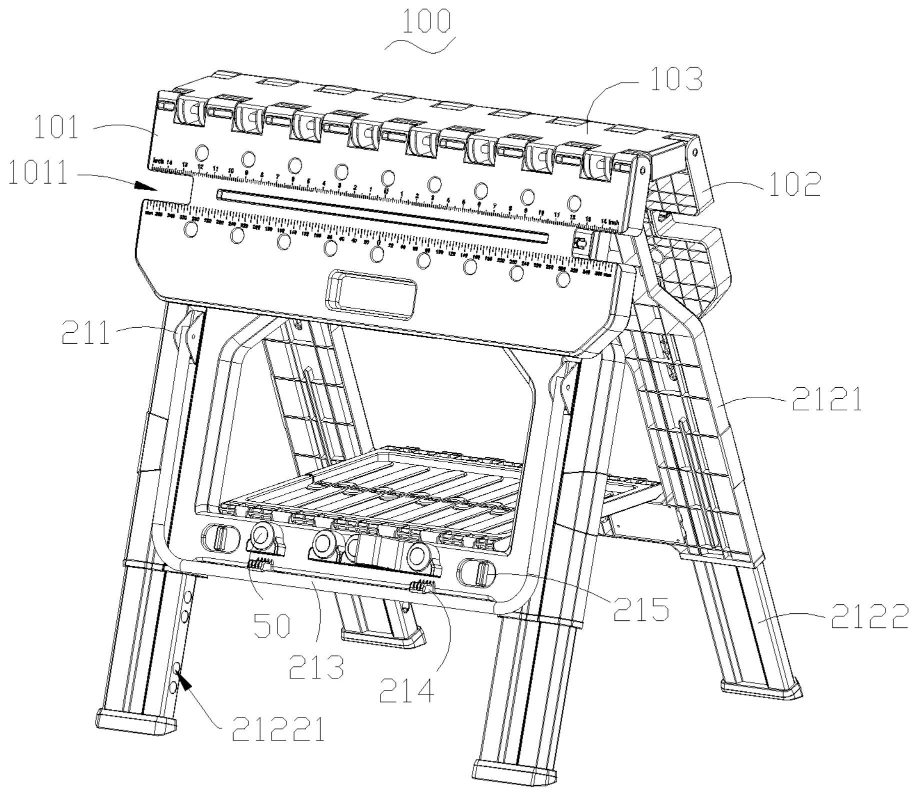
FIG. 3 is a schematic diagram of the workbench in FIG. 2, wherein a part of the workbench is folded.
Figure 4:
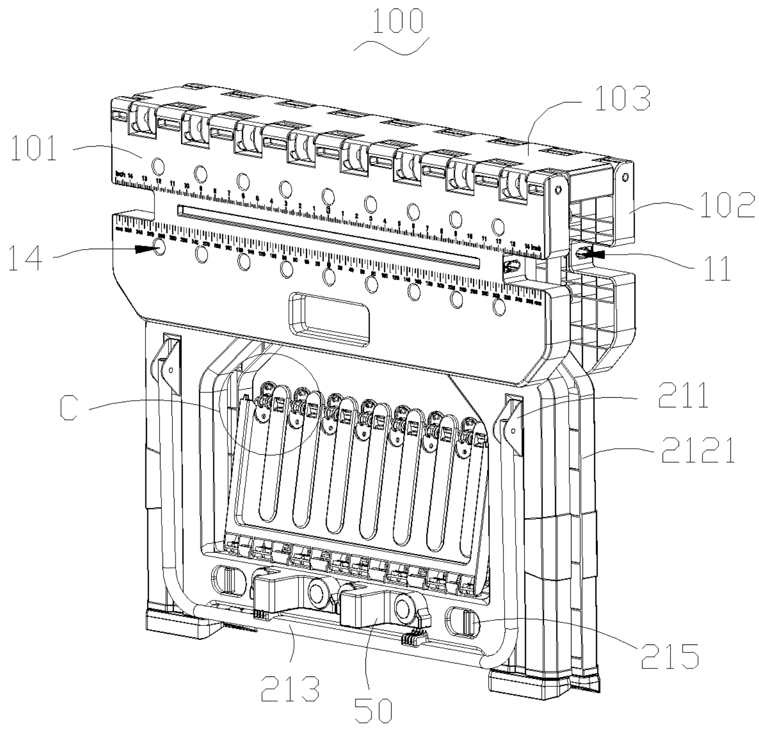
FIG. 4 is a schematic diagram of the workbench in FIG. 2, wherein the workbench is completely folded.

In some embodiments, referring to FIG. 3 and FIG. 4, the operating portion 10 can include a folding portion (not labelled) and a fixing portion 103. The folding portion can be rotatably connected to the fixing portion 103, and the folding portion can be folded relative to the fixing portion 103 and accommodated. The fixing portion 103 can be connected to the supporting portion 20, which is configured for supporting the operating portion 10 via the fixing portion 103. When the user needs a larger operating portion 10, the folding portion can be rotated and transformed to an expanding state. When the user wants to accommodate the workbench 100, the folding portion can be rotated relative to the fixing portion 103 and transformed to a folding state, to reduce space occupied by the workbench 100.

Furthermore, the folding portion can further include a first folding portion 101 and a second folding portion 102. The first folding portion 101 and the second folding portion 102 can be disposed at two sides of the fixing portion 103, respectively, and able to fold relative to the fixing portion 103, respectively. Due to the design of the first folding portion 101 and the second folding portion 102, the operating portion 10 can be used in more situations. The operating portion 10 in the expanding state can have a larger area, and the operating portion 10 in the folding state can occupy smaller storage space.

Furthermore, in the first embodiment, the operating portion 10 can include two first accommodating grooves 11. The two first accommodating grooves 11 can be located in the first folding portion 101 and the second folding portion 102, respectively. The first accommodating groove can penetrate through two sides of the first folding portion 101 or the second folding portion 102 separated from each other, so that the fixture 210 can insert into the first accommodating groove 11 from different positions of the operating portion 10. Therefore, the workbench module 200 can be used in more situations. In some embodiments, a plurality of first accommodating grooves 11 can further be located on the first folding portion 101 and/or the second folding portion 102, which are not limited herein.

Figure 28:
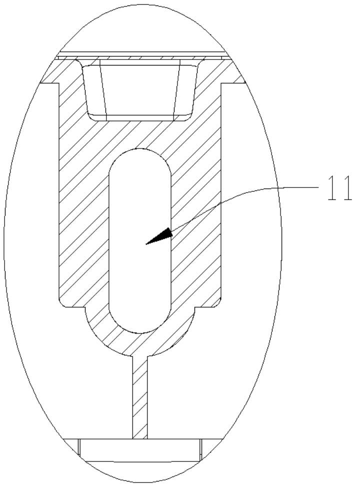
FIG. 28 is a structural schematic diagram of a first accommodating groove in an embodiment of the present disclosure.
Figure 29:
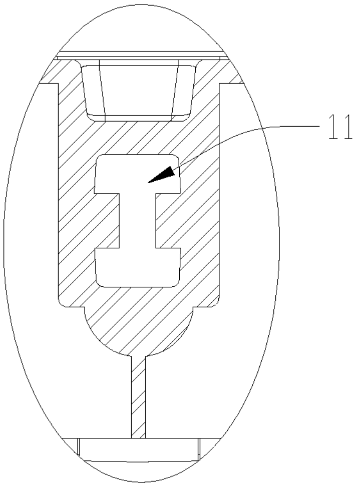
FIG. 29 is a structural schematic diagram of a first accommodating groove in another embodiment of the present disclosure.
Figure 30:
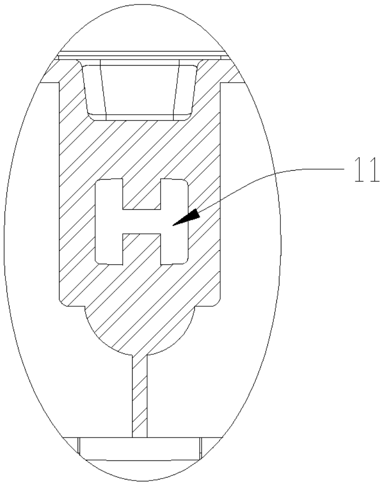
FIG. 30 is a structural schematic diagram of a first accommodating groove in another embodiment of the present disclosure.
Figure 31:
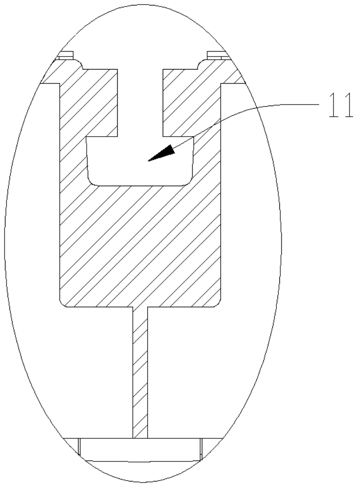
FIG. 31 is a structural schematic diagram of a first accommodating groove in another embodiment of the present disclosure.
Figure 32:
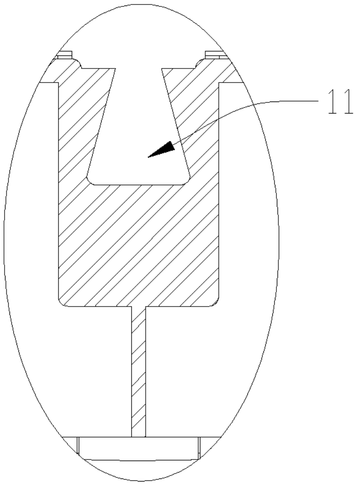
FIG. 32 is a structural schematic diagram of a first accommodating groove in another embodiment of the present disclosure.
Figure 33:
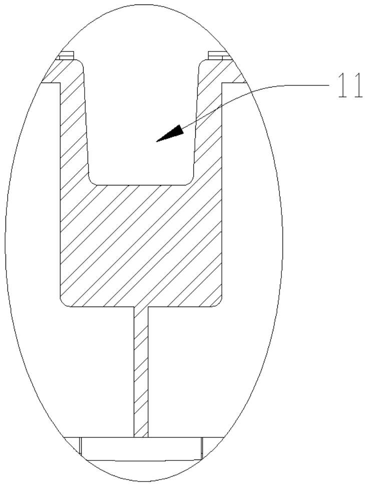
FIG. 33 is a structural schematic diagram of a first accommodating groove in another embodiment of the present disclosure.

It should be noted that the first accommodating groove 11 can be a closed through hole as shown in FIG. 28 to FIG. 30. Alternatively, the first accommodating groove 11 can be an opening groove as shown in FIG. 31 to FIG. 33. From the perspective of a shape of a cross-section of the groove, the first accommodating groove 11 should be able to let the rod 2110 insert in and be fixed. The cross-section of the first accommodating groove 11 can be strip-shaped (as shown in FIG. 28), "I"-shaped (as shown in FIG. 29 to FIG. 31), trapezoid-shaped (as shown in FIG. 32) and the like. It should be understood that all the first accommodating grooves 11 above can improve stability of the rod 2110 in the first accommodating groove 11, so that the rod 2110 can be hard to separate from the first accommodating groove 11. In some embodiments, in order to facilitate the user placing the rod 2110 into the first accommodating groove 11, the first accommodating groove 11 can be U-shaped (as shown in FIG. 32), or in other shapes facilitating placing the rod 2110, which are not limited in the present disclosure.

Figure 5:
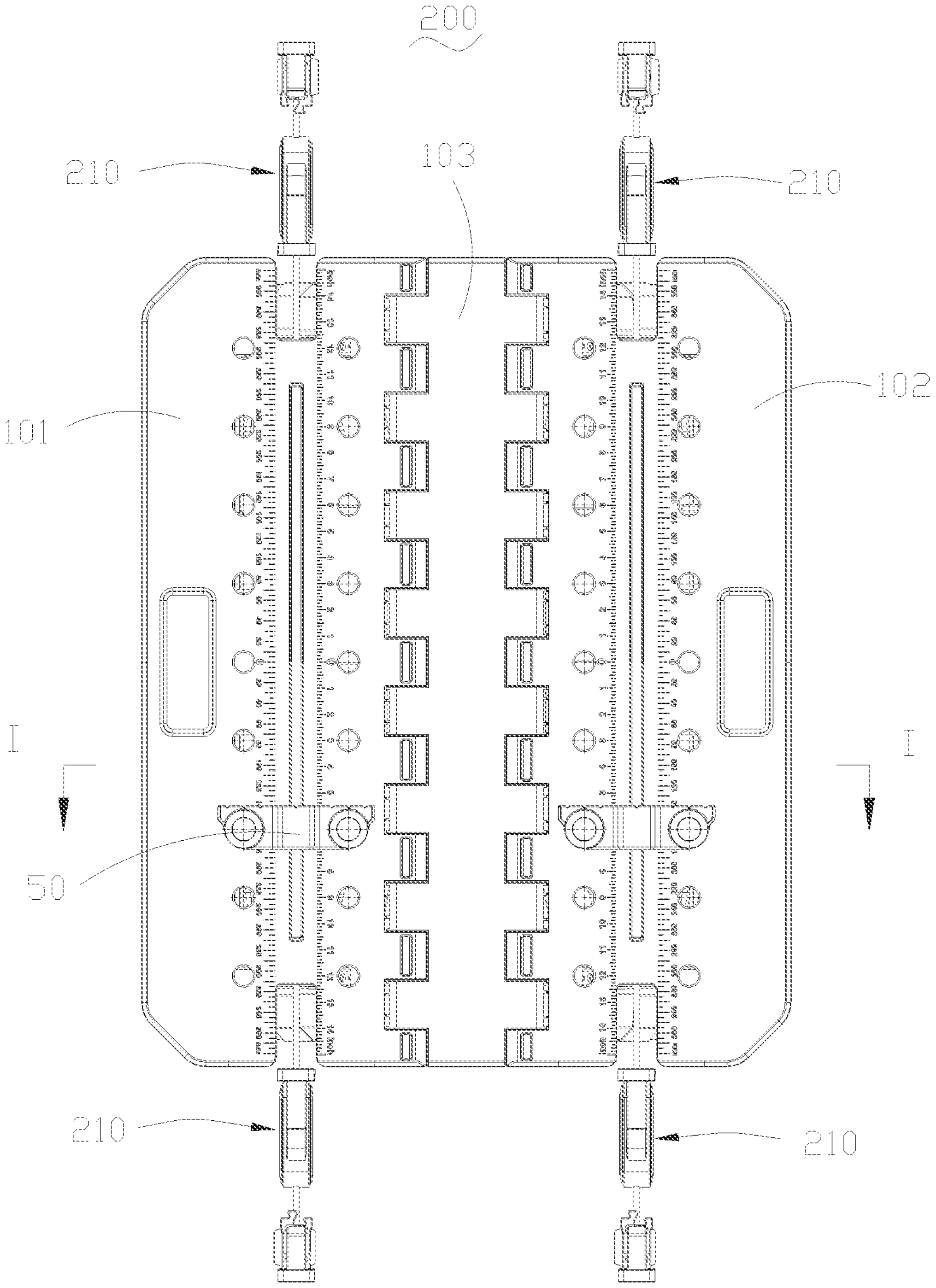
FIG. 5 is an assembly diagram of the workbench of the first embodiment in the present disclosure and four fixtures.
Figure 19:
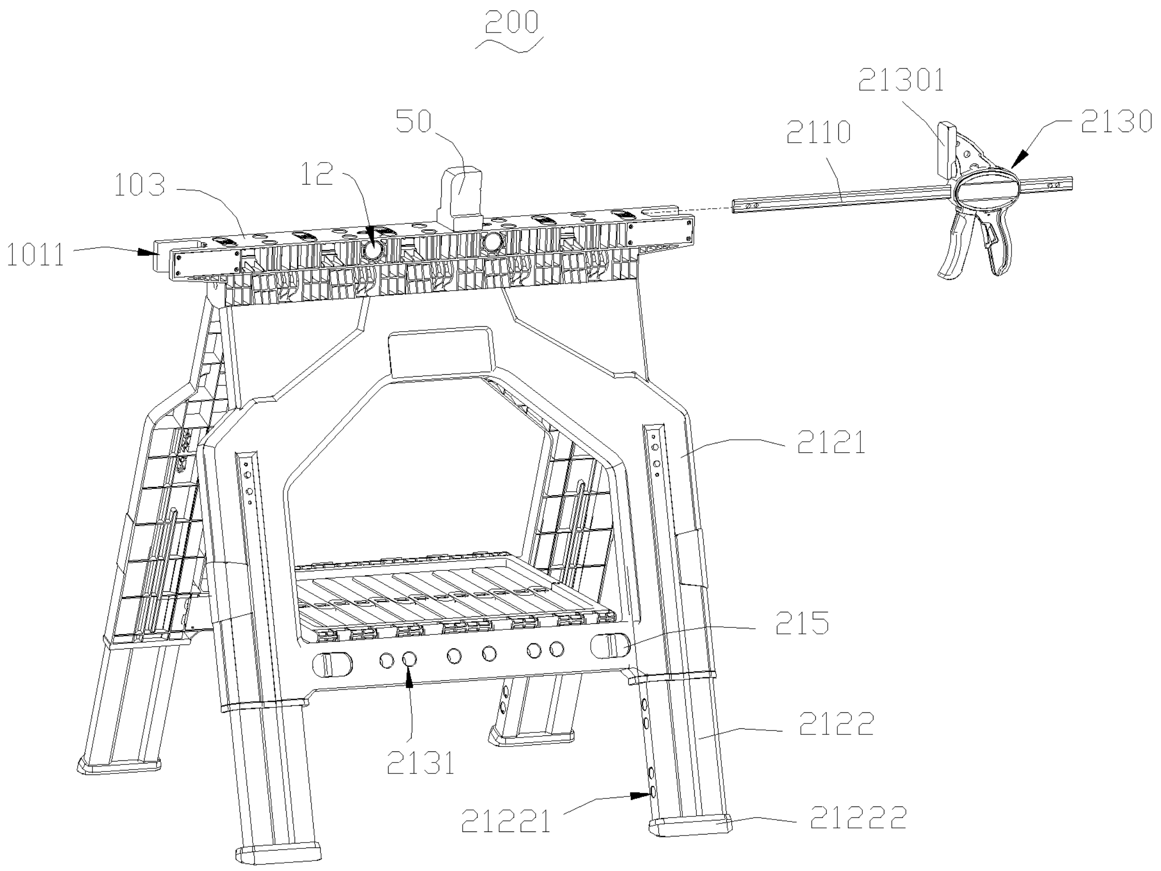
FIG. 19 is a structural schematic diagram of a workbench module in a second embodiment of the present disclosure.
Figure 20:
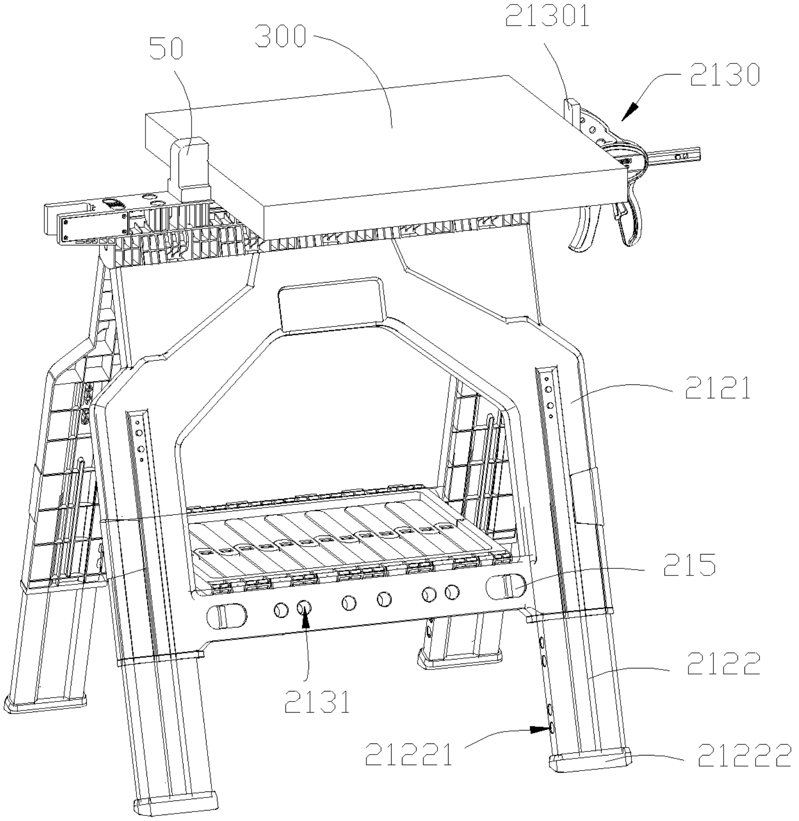
FIG. 20 is a schematic diagram of the workbench module in the second embodiment of the present disclosure, which is used in a fourth scenario.
Figure 21:
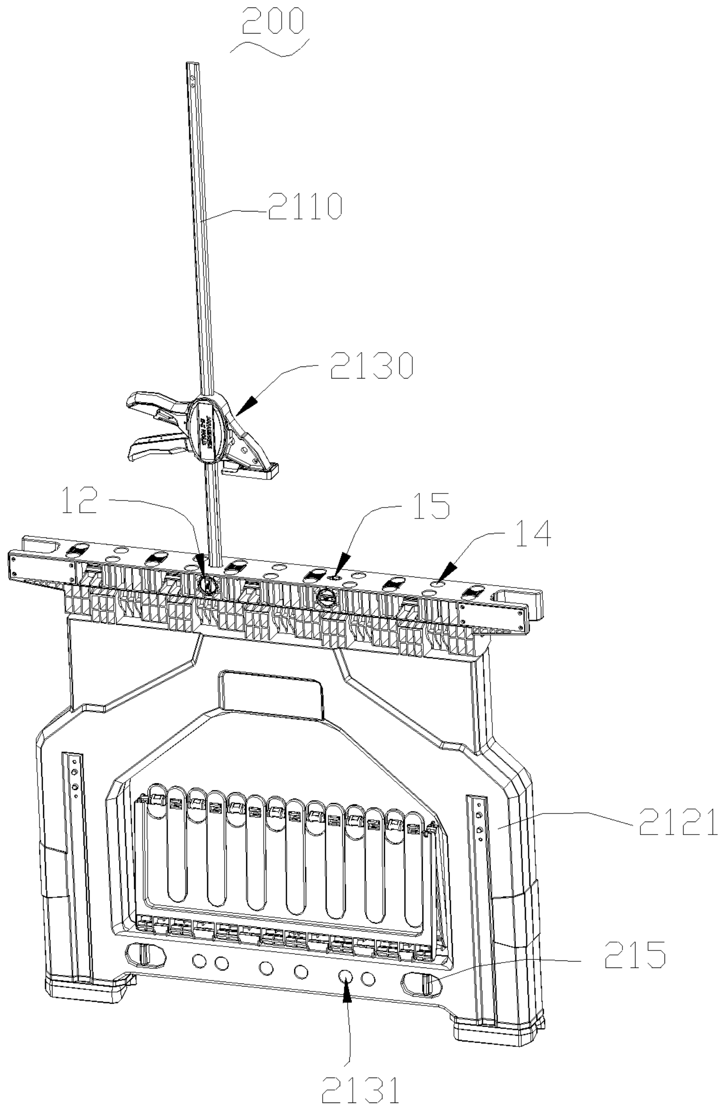
FIG. 21 is a schematic diagram of the workbench module in the second embodiment of the present disclosure, which is used in a fifth scenario.

It should be understood that the workbench 100 can cooperate with a plurality of fixtures 210 at the same time, and the plurality of fixtures 210 can cooperate with each other. Therefore, the workbench module 200 can be used in more situations, and clamp the external object 300 more firmly (as shown in FIG. 5). Moreover, in other embodiments, for example in a second embodiment as shown in FIG. 19 to FIG. 21, the first accommodating groove 11 can be located on the fixing portion 103 and the workbench 100 can be provided without the folding portion.

Figure 6:
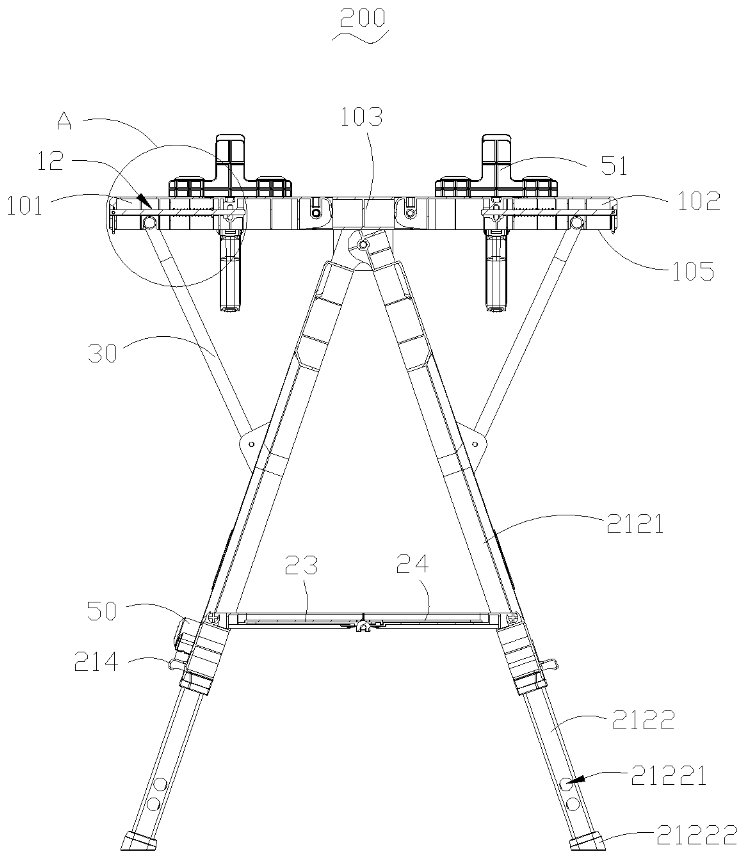
FIG. 6 is a cross-sectional view of the workbench of along I-I line in FIG. 5.
Figure 7:
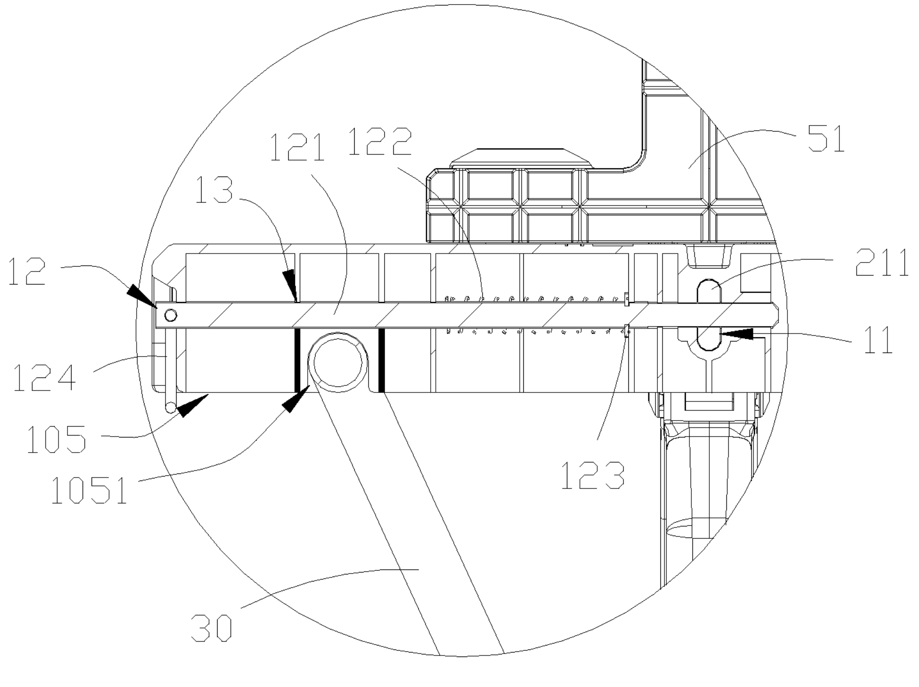
FIG. 7 is an enlarged view of A portion in FIG. 6.

Referring to FIG. 6 to FIG. 7, the workbench 100 can include a first locating portion 12, which can insert into the first accommodating groove 11 and be configured for limiting the rod 2110 to move within the first accommodating groove 11.

It should be understood that in other embodiments a pin (not shown in the figures) on the rod 2110 can be used to locate the rod 2110 and prevent the rod 2110 from moving in the first accommodating groove 11, as long as the rod 2110 can be detachably fixed in the first accommodating groove 11.

In some embodiments, the workbench 100 can include a first mounting hole 13 penetrating through the first accommodating groove 11. The first locating portion 12 can include a locating pin 121, which can be able to move in the first mounting hole 13 and insert into a locating hole 21101 of the rod 2110, resulting in the rod 2110 detachably fixing in the first accommodating groove 11. That detachably disposing the rod 2110 in the first accommodating groove 11 via the locating pin 121 can be easy to operate. Moreover, the rod 2110 can be fixed by the locating hole 21101 in the fixture 210, resulting in that the workbench 100 can cooperate with the conventional fixture. Therefore, the workbench 100 can be used in more situations. It should be understood that the first locating portion 12 can be disposed on the workbench 100 via other structures such as a mounting groove and the like, which are not limited in the present disclosure.

Furthermore, the first locating portion 12 further can include a first elastic member 122, which can be configured for applying an elastic force on the locating pin 121, resulting in the locating pin 121 extending into and remaining in the locating hole 21101, thereby preventing the rod 2110 from moving in the first accommodating groove 11.

In order to facilitate the first elastic member 122 applying an elastic force on the locating pin 121, the first locating portion 12 can further include a limiting sheet 123. The limiting sheet 123 can be sleeved on and fixed to the locating pin 121. The first elastic member 122 can be sleeved on the locating pin 121, and two ends of the first elastic member 122 can abut against the limiting sheet 123 and the operating portion 10, respectively, so that the first elastic member 122 can be configured for applying an elastic force on the locating pin 121 via the limiting sheet 123.

In order to facilitate processing, in the present disclosure, the limiting sheet 123 and the locating pin 121 can be formed integrally. It should be understood that the limiting sheet 123 and the locating pin 121 can be formed separately and fixed together.

In some embodiments, a back surface 105 of the operating portion 10 can include net-shaped reinforcing plates. The first elastic member 122 can abut against the net-shaped reinforcing plates of the back surface 105, as shown FIG. 7. The net-shaped reinforcing plates not only can reduce the weight of the workbench 100, but also can improve strength of the workbench 100 and prevent the workbench 100 from deforming during processing. Meanwhile, the net-shaped reinforcing plates can facilitate assembling elements on the operating portion 10, and facilitate disposing and reconditioning the first elastic member 122. It should be understood that the back surface 105 of the operating portion 10 is not limited to the net-shaped reinforcing plate, other structures (e.g., a flap) can also be disposed on the operating portion 10, so that the first elastic member 122 can abut against the flap.

For convenience of the user, the first locating portion 12 can further include an operating member 124. The operating member 124 can be movably connected to an end away from the first accommodating groove 11 of the locating pin 121. The operating member 124 can be configured for the user to draw the locating pin 121. In some embodiments, the operating member 124 can be circle-shaped, which is not easy to hurt the user. Moreover, the operating member 124 can naturally hang down on a side of the operating portion 10 when the user is not using the workbench 100, so as to facilitate accommodating and using the workbench 100.

Figure 15:
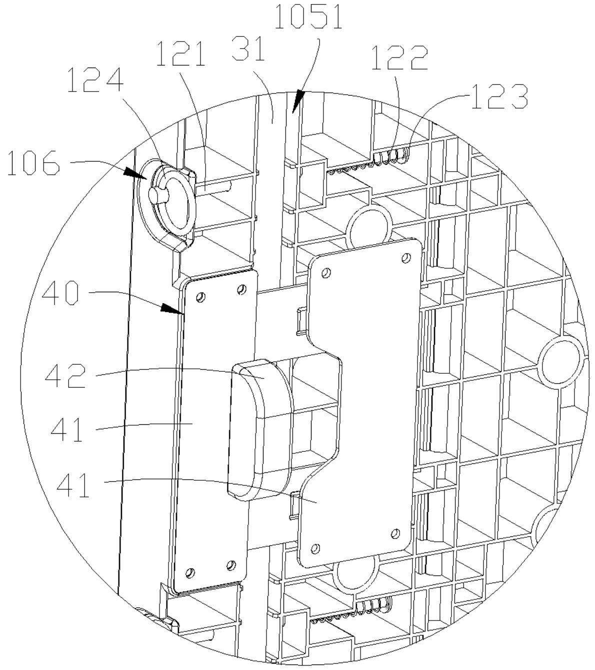
FIG. 15 is an enlarged view of E portion in FIG. 14.
Figure 16:
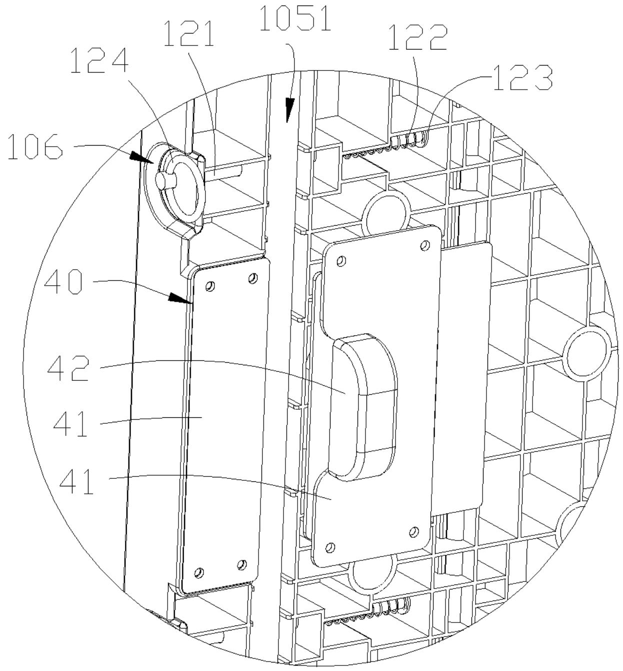
FIG. 16 is a schematic diagram of a first locking member in FIG. 15 in an opening state.

Furthermore, in order to protect the operating member 124 and facilitate accommodating the operating member 124, a first groove 106 can be located on a sidewall of the workbench 100, and the first groove 106 is configured for accommodating the operating member 124 (as shown in FIG. 15 and FIG. 16).

Referring to FIG. 2 to FIG. 4 and FIG. 8 to FIG. 10, the workbench 100 can further include a supporting portion 20 configured for supporting the operating portion 10. It should be understood that in an embodiment not shown in the present disclosure, the workbench 100 can be provided without the supporting portion 20. The operating portion 10 can be disposed on the table or fixed by other common structures, which are not limited in the present disclosure.

Specifically, the supporting portion 20 can include a first frame body 21 and a second frame body 22, and both the first frame body 21 and the second frame body 22 can be rotatably connected to the operating portion 10. The first frame body 21 can rotate and move away from the second frame body 22, and the second frame body 22 can rotate and move away from the first frame body 21. At this time, the first frame body 21 and the second frame body 22 can form a supporting state. In the supporting state, the first frame body 21 and the second frame body 22 can support the workbench 100 to make the workbench stand on the ground. The first frame body 21 can rotate and move towards the second frame body 22, and the second frame body 22 can rotate and move towards the first frame body 21. At this time, the first frame body 21 and the second frame body 22 can form an accommodating state, so as to reduce the space occupied by the supporting portion 20.

In some embodiments, both the first frame body 21 and the second frame body 22 can include two supporting rods 212 and a connecting rod 213. The connecting rod 213 can be configured for connecting the two supporting rods 212 to increase mechanical strength of the first frame body 21 and the second frame body 22 and prevent the first frame body 21 and the second frame body 22 from deforming. It should be understood that the first frame body 21 and/or the second frame body 22 can be provided without the connecting rod 213. The first frame body 21 and/or the second frame body 22 without the connecting rod 213 can also support the workbench 100.

Figure 14:
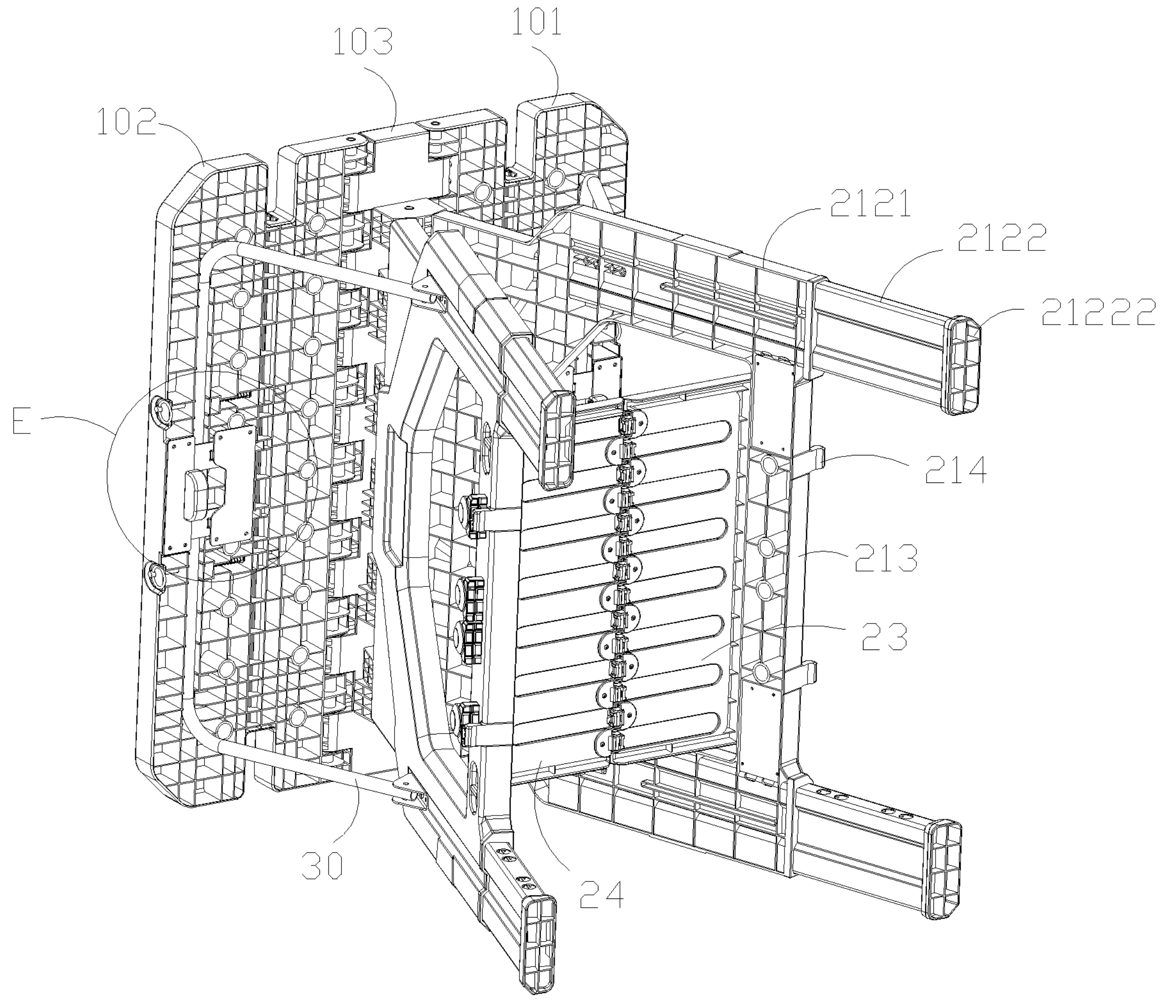
FIG. 14 is a structural schematic diagram of the workbench module in FIG. 2 from another viewing angle.

In the present embodiment, referring to FIG. 14, the supporting member 30 can be a U-shaped rod, and two ends of the U-shaped rod can be pivotally connected to the two supporting rods 212 of the first frame body 21 or two supporting rods 212 of the second frame body 22. A middle section 31 of the U-shaped rod can be configured for contacting with and supporting the first folding portion 101 and the second folding portion 102 to remain the first folding portion 101 or the second folding portion 102 in the expanding state. The middle section 31 of the U-shaped rod can be configured for supporting the first folding portion 101 and the second folding portion 102, and can have relatively good supporting effect. In some embodiments, the supporting member 30 can have other shapes. In some embodiments, a plurality of supporting members 30 can be disposed on the first frame body 21 or the second frame body 22. For example, two T-shaped rods can be rotatably connected to the two supporting rods 212 of the first frame body 21 or the two supporting rods 212 of the second frame body 22. A cross-rod of the T-shaped rod can be configured for supporting the first folding portion 101 and the second folding portion 102.

In the present embodiment, the connecting rod 213 can include a hook portion 214, and the hook portion 214 can be configured for clipping the middle section 31 of the U-shaped rod to prevent the supporting member 30 from rotating towards a direction away from the connecting rod 213. Therefore, the supporting member 30 will not move from back to forth during storing and transporting the workbench 100, and this can facilitate storing the workbench 100. It should be understood that in other embodiments, the hook portion 214 can further be disposed on the supporting rod 212, as long as the hook portion 214 can be configured for clipping the supporting member 30. Moreover, the supporting member 30 can be disposed at different positions of the hook portion 214 according to a shape of the supporting member 30.

The hook portion 214 and the connecting rod 213 can be formed integrally, or can be formed separately and then fixed together. Alternatively, the hook portion 214 can be detachably connected to the connecting rod 213, resulting in the hook portion 214 disposing at different positions of the connecting rod 213.

In some embodiments, the workbench 100 can further include two supporting members 30. The two supporting members 30 can be rotatably connected to the supporting portion 20, and the two supporting members 30 can be configured for supporting the first folding portion 101 and the second folding portion 102, respectively. Therefore, the first folding portion 101, the second folding portion 102 and the fixing portion 103 can form the operating surface 104 for the user to use. Therefore, a bearing capacity of the first folding portion 101 and the second folding portion 102 can be improved by the supporting member 30, so that the workbench 100 can bear a heavier external object. It should be understood that the first folding portion 101/the second folding portion 102 can be expanded or folded by other common methods. For example, a limiting structure can be disposed at a position at which the first folding portion 101/the second folding portion 102 is connected to the fixing portion 103. The limiting structure can be configured for preventing the first folding portion 101/the second folding portion 102 from rotating relative to the fixing portion 103, so that the first folding portion/the second folding portion 102 can form the operating surface 104 with the fixing portion 103.

Furthermore, a mounting frame 211 can be fixed to the first body 21 and/or the second frame body 22, and the supporting member 30 can be rotatably disposed on the mounting frame 211.

In some embodiments, when the first folding portion 101 and/or the second folding portion 102 is in a folding state, a gap can be defined between the first folding portion 101 and the mounting frame 211 and/or between the second folding portion 102 and the mounting frame 211. Therefore, the mounting frame 211 will not affect folding of the first folding portion 101 and/or the second folding portion 102. That is, the mounting frame 211 will not collide with the first folding portion 101 and/or the second folding portion 102.

In order to improve stability of the supporting member 30 when supporting the first folding portion 101/the second folding portion 102, a second accommodating groove 1051 can be defined on the back surface 105 of the first folding portion 101/the second folding portion 102. The second accommodating groove 1051 can accommodate and limit the supporting member 30, and a wall of the second accommodating groove 1051 can prevent the supporting member 30 from separating from the second accommodating groove 1051. Specifically, the second accommodating groove 1051 can be configured for accommodating the supporting member 30 and contacting and supporting a part of the first folding portion 101/the second folding portion 102 of the supporting member 30.

In some embodiments, referring to FIG. 14 to FIG. 16, in order to further improve stability of the supporting member 30 when supporting the first folding portion 101/the second folding portion 102, the operating portion 10 can further include a first locking member 40. The first locking member 40 can be disposed on a side near the supporting portion of the first folding portion 101 and/or a side near the supporting portion of the second folding portion 102, that is, the back surface 105 of the first folding portion 101 and/or the back surface 105 of the second folding portion 102. The first locking member 40 can be configured for fixing the supporting member 30 to the first folding portion 101 or the second folding portion 102.

In the present embodiment, the first locking member 40 can include a mounting portion 41 and a first locking portion 42. The mounting portion 41 can be fixed to the first folding portion 101 or the second folding portion 102. The first locking portion 42 can be movably connected to the mounting portion 41, and the first locking portion 42 can be configured for locking the supporting member 30 between the first folding portion 101 and the first locking portion 42 or between the second folding portion 102 and the first locking portion 42. It should be understood that in an embodiment not shown in the present disclosure, the first locking member 40 can be in other structures such as in a buckle structure, as long as the first locking member 40 can prevent the supporting member 30 from separating from the first folding portion 101 or the second folding portion 102.

It should be understood that when the first locking member 40 is disposed on the back surface 105 of the first folding portion or the back surface 105 of the second folding portion 102, the supporting member 30 can be fixed without the second accommodating groove 1051. That is, both the second accommodating groove 1051 and the first locking member 40 can be disposed on the workbench 100, or one of the second accommodating groove 1051 and the first locking member 40 can be disposed on the workbench 100.

In some embodiments, the supporting rod 212 can be a telescopic rod, which can facilitate adjusting a height of the operating portion 10. Therefore, the workbench 100 can be used in more situations.

Specifically, referring to FIG. 3 and FIG. 25 to FIG. 27, the supporting rod 212 can include an outer rod 2121 and an inner rod 2122, and the inner rod 2122 can slide in the outer rod 2121. A second locking member 215 can be disposed on the connecting rod 213. The second locking member 215 can be configured for locking the inner rod 2122 to a preset position on the outer rod 2121.

Furthermore, the second locking member 215 can include a second locking portion 2151 and a pushing portion 2152, which can be fixed to each other. A locking hole 21221 can be defined on the inner rod 2122, and a chute 2132 can be defined on the connecting rod 213. The user can control the pushing portion 2152 to slide in the chute 2132, so that the second locking portion 2151 can insert into the locking hole 21221 to lock the inner rod 2122 with the outer rod 2121. Alternatively, the second locking portion 2151 can separate from the locking hole 21221 to unlock the inner rod 2122 and the outer rod 2121.

In some embodiments, the supporting portion 20 can further include a second elastic member 216, which can be configured for applying an elastic force on the second locking portion 2151. When the inner rod 2122 slide to a preset position in the outer rod 2121, the second locking portion 2151 can automatically insert into the locking hole 21221 under the action of the second elastic member 216, and lock the inner rod 2122 at the preset position in the outer rod 2121.

In order to facilitate adjusting a height of the workbench 100, a plurality of locking holes 21221 can be defined on the inner rod 2122. The plurality of locking holes 21221 can be arranged along an axis of the inner rod 2122, so that a relative position between the inner rod 2122 and the outer rod 2121 can be more flexible.

Figure 27:
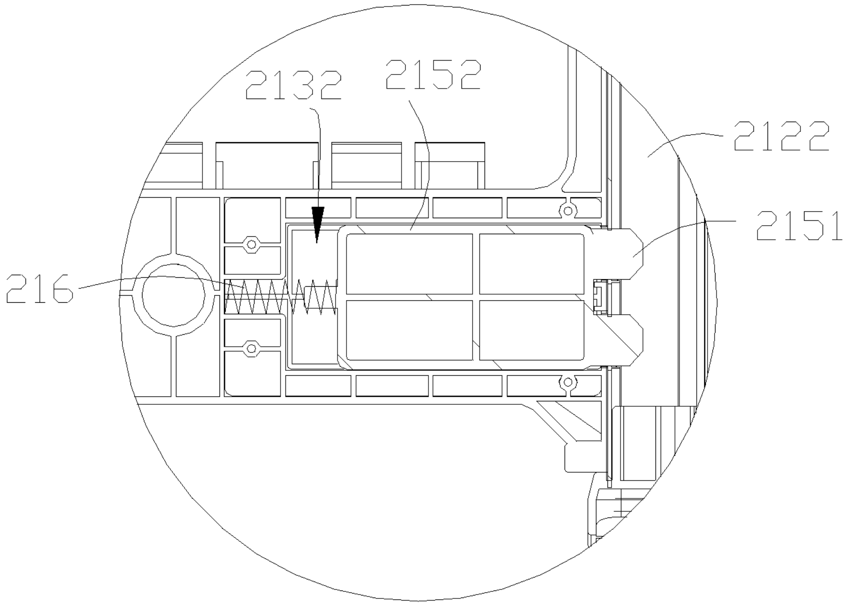
FIG. 27 is an enlarged view of H portion in FIG. 25.

Referring to FIG. 27, in order to improve stability of the second elastic member 216, a protrusion (not labelled) can be disposed at an end near the second elastic member 216 of the second locking portion 2151. A groove (not labelled) can be defined on the connecting rod 213. One end of the second elastic member 216 can be sleeved on the protrusion, and the other end of the elastic member 216 can be located in the groove.

In some embodiments, referring to FIG. 6, a mat 21222 can be disposed at an end away from the operating portion 10 of the inner rod 2122, and the mat 21222 can be disposed between the inner rod 2122 and the ground. The mat 21222 can be anti-skid members such as a rubber mat and the like, so as to avoid instability of the workbench 100 during use and reduce harm to the ground.

Furthermore, referring to FIG. 2, the supporting portion 20 further can include a first foldable plate 23 and a second foldable plate 24. A side away from the second foldable plate 24 of the first foldable plate 23 can be rotatably connected to the connecting rod 213 of the first frame body 21. A side away from the first foldable plate 23 of the second foldable plate 24 can be rotatably connected to the connecting rod 213 of the second frame body 22. The first foldable plate 23 can be rotatably connected to the second foldable plate 24. Therefore, when the first frame body 21 and the second frame body 22 are in the accommodating state, the first foldable plate 23 and the second foldable plate 24 can be folded up to reduce the space occupied by the workbench 100. Moreover, the first foldable plate 23 and the second foldable plate 24 can be expanded when the first frame body 21 and the second frame body 22 are in the expanding state, so as to bear tools or components to be used.

Figure 12:
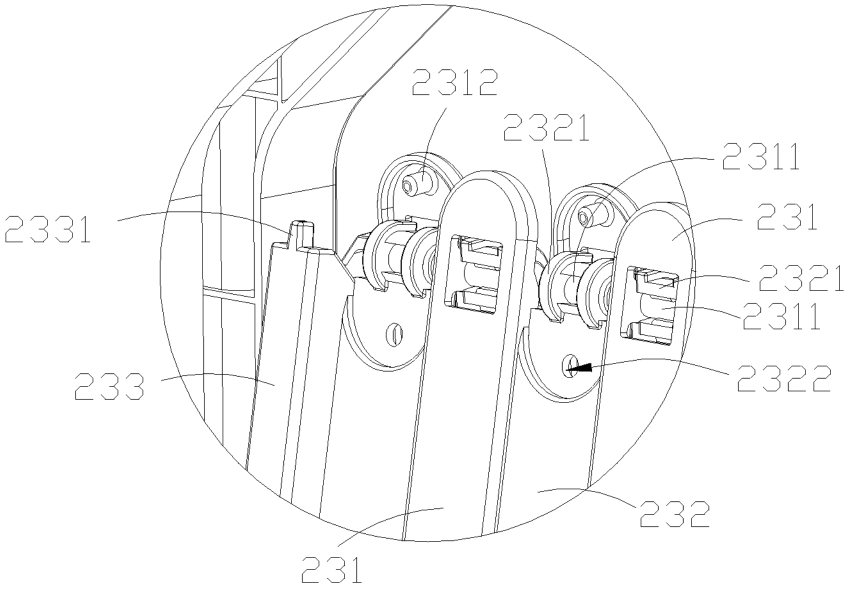
FIG. 12 is an enlarged view of C portion in FIG. 4.

In the present embodiment, referring to FIG. 4 and FIG. 12, both the first foldable plate 23 and the second foldable plate 24 can include a plurality of axle pin plates 231 and a plurality of axle sleeve plates 232 which are staggered with each other. The plurality of axle pin plates 231 can be provided with a pin axle 2311, and the plurality of axle sleeve plates 232 can be provided with an axle sleeve 2321 matching with the pin axles 2311. The pin axle 2311 of the plurality of first foldable plates 23 can be disposed in the axle sleeve 2321 of the plurality of second foldable plates 24, and the pin axle 2311 of the plurality of second foldable plates 24 can be disposed in the axle sleeve 2321 of the plurality of first foldable plates 23, resulting in forming a rotatable connection between the first foldable plate 23 and the second foldable plate 24. It should be understood that the first foldable plate 23 and the second foldable plate 24 can be in other structures, as long as the first foldable plate 23 and the second foldable plate 24 can be folded up to accommodate or expand to form the bearing surface.

In some embodiments, the axle sleeve plate 232 of the first foldable plate 23 and the axle pin plate 231 of the first foldable plate 23 can be staggered disposed at a side near the second foldable plate 24 of the first foldable plate 23. Similarly, the axle sleeve plate 232 of the second foldable plate 24 and the axle pin plate 231 of the second foldable plate 24 can be staggered disposed at a side near the first foldable plate 23 of the second foldable plate 24. The first foldable plate 23 and the second foldable plate 24 can limit each other via the staggered disposed axle sleeve plate 232 and the axle pin plate 231, so that the first foldable plate 23 and the second foldable plate 24 can form a stable bearing surface in the expanding state.

In order to improve stability of the first foldable plate 23 and the second foldable plate 24 in the expanding state, in some embodiments, a limiting member 2312 can be disposed on and protrude from the pin axle plate 231, and a limiting hole 2322 can be defined on the axle sleeve plate 232, and the limiting member 2312 can be disposed in the limiting hole. It should be understood that the limiting hole 2322 can be a through hole or a blind hole, as long as the limiting member 2312 can be inserted in and clipped to the limiting hole 2322.

Both the first foldable plate 23 and the second foldable plate 24 can include a peripheral plate 233, which can be located around the axle pin plate 231 and the axle sleeve plate 232.

Figure 13:
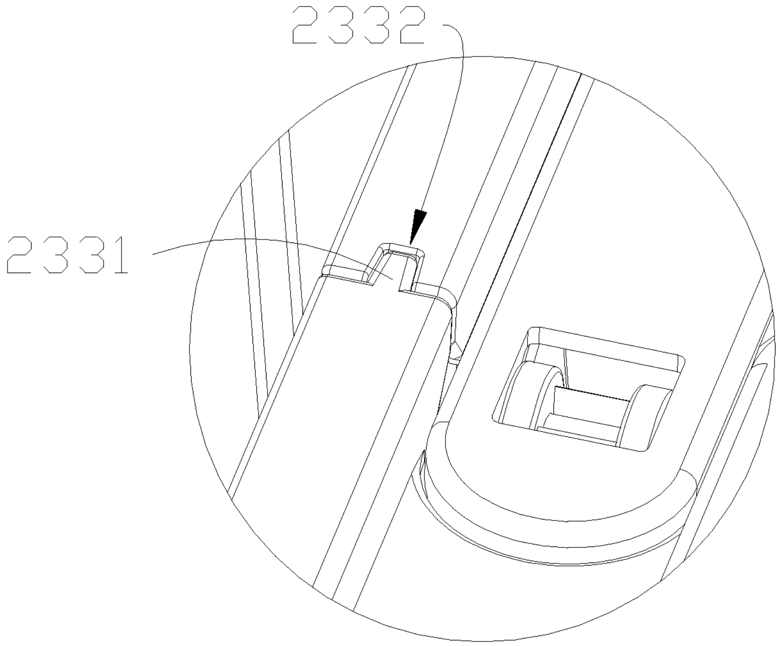
FIG. 13 is an enlarged view of D portion in FIG. 10.

Furthermore, referring to FIG. 10 and FIG. 13, the peripheral plate 233 of the first foldable plate 23 can be provided with a stopper 2331, and the peripheral plate 233 of the second foldable plate 24 can be provided with a limiting groove 2332. Alternatively, the peripheral plate 233 of the second foldable plate 24 can be provided with the stopper 2331, and the peripheral plate 233 of the first foldable plate 23 can be provided with the limiting groove 2332. The limiting groove 2332 can be configured for accommodating and limiting the stopper 2331, so as to limit a rotation angle defined between the first foldable plate 23 and the second foldable plate 24.

It should be understood that the first foldable plate 23 and the second foldable plate 24 can limit each other merely via the staggered disposed axle sleeve plate 232 and the axle pin plate 231. Alternatively, the first foldable plate 23 and the second foldable plate 24 can limit each other merely via cooperation between the stopper 2332 and the limiting groove 2332. Alternatively, the first foldable plate 23 and the second foldable plate 24 can limited each other via combination of the two kinds of limiting structures, which are not limited in the present disclosure.

Referring to FIG. 8 and FIG. 10, in order to further improve using flexibility of the workbench 100 when clamping the external object 300, in some embodiments, the workbench 100 can further include a fixing member 50, which can further include a third clamping surface 51. The fixing member 50 can be disposed on the operating portion 10. A second clamping surface 21301 of the movable fixture body 2130 and the third clamping surface 51 can cooperate with each other to clamp the external object 300.

A distance between two adjacent second mounting holes 14 of the plurality of second mounting holes 14 can match a depth of the second groove 1011. When the second clamping surface 21301 of the movable fixture body 2130 matches with the third clamping structure 51 of the fixing member 50, the second clamping surface 21301 can contact with the third clamping surface 51. Therefore, any external objects with different sizes can be clamped, and the workbench 100 can be widely used. In the present disclosure, the depth of the second groove 1011 is a depth of the second groove 1011 inserting into the first accommodating groove 11 along an inserting direction.

Figure 17:
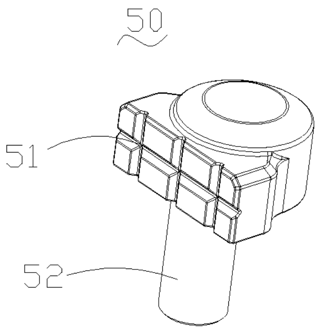
FIG. 17 is a structural schematic diagram of a fixing member.
Figure 18:
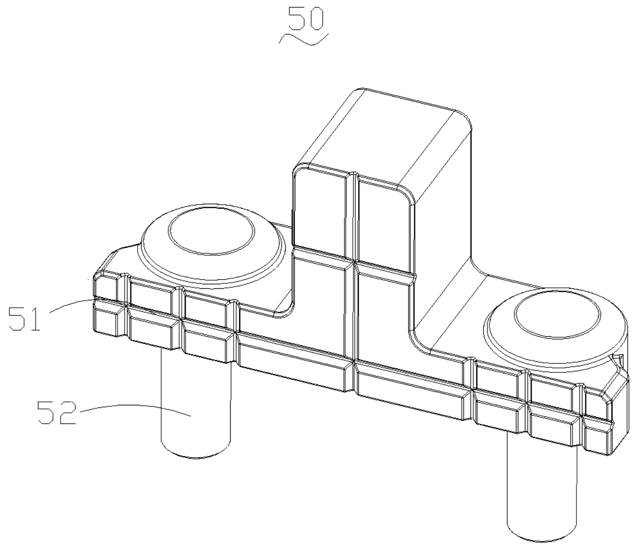
FIG. 18 is a structural schematic diagram of a fixing member.

Referring to FIG. 17 and FIG. 18, specifically, the mounting member 52 can be disposed on the fixing member 50 and protrude out from the fixing member 50. The second mounting hole 14 can be defined on the operating portion 10, and the mounting member 52 can be able to insert into the second mounting hole 14, so that the fixing member 50 can be disposed on the operating portion 10.

In some embodiments, referring to FIG. 8, a plurality of second mounting holes 14 can be defined on the operating portion 10, and the plurality of second mounting holes 14 can be divided into two sets. The two sets of the plurality of second mounting holes 14 can be located at two sides of the first accommodating groove 11, respectively.

Furthermore, two mounting members 52 can be disposed on the fixing member and protrude from the fixing member 50. The two mounting members 52 can insert into two of the plurality of second mounting holes 14 on two sides of the first accommodating groove 11, respectively.

In some embodiments, one mounting member 52 can be disposed on the fixing member 50. Referring to FIG. 10, two fixing members 50 can insert into two the second mounting holes 14, respectively. The two third clamping surfaces 51 of the two fixing members 50 can cooperate with the second clamping surface 21301 of the movable fixture body 2130 to clamp the external object 300. This can facilitate clamping an external object 300 which is not in square-shaped. For example, this can facilitate clamping a structure having a circle-shaped peripheral wall.

In some embodiments, the two sets of second mounting holes 14 can be aligned in pairs with the first accommodating groove 11 as a center line, respectively. A line defined by two corresponding second mounting holes in a pair can be perpendicular to an axis of the first accommodating groove 11. The second mounting holes 14 in each of the two sets are evenly distributed along the axis of the first accommodating groove 11. It should be understood that the second mounting holes 14 can be distributed in other methods, which are not limited in the present disclosure.

Furthermore, in each of the two sets of the plurality of second mounting holes 14, a distance between two adjacent second mounting holes 14 of the plurality of second mounting holes 14 can be less than or equal to a depth of the second groove 1011. In some embodiments, in each of the two sets of the plurality of second mounting holes 14, the distance between two adjacent second mounting holes 14 of the plurality of second mounting holes 14 can be a little less than the depth of the second groove 1011. Therefore, the second clamping surface 21301 of the movable fixture body 2130 and the third clamping surface 51 of the fixing member 50 can define a continuously range of clamping the external object by designing the distance between two adjacent second mounting holes 14 of the plurality of second mounting holes 14. Thus, the workbench 100 can be used to clamp the external object 300 with any size, even if the external object 300 is very small.

In some embodiments, the second mounting hole 14 can be configured for inserting the rod 2110 of the fixture 210. The rod 2110 can be detachably fixed to the second mounting hole 14 via the first locating portion 12, and the rod 2110 can be perpendicular to the operating surface 104 of the workbench 100. Referring to FIG. 9, the operating surface 104 of the workbench 100 can cooperate with the movable fixture body 2130 of the fixture 210 to clamp the external object 300. Therefore, not only the rod 2110 can be detachably fixed to the first accommodating groove 11 via the first locating portion 12, but also the rod 2110 can be detachably fixed in the second mounting hole 14 via the first locating portion 12. Moreover, the second mounting hole 14 not only can cooperate with the fixing member 50, but also can cooperate with the rod 2110. Therefore, the workbench 100 can be more widely used. It should be understood that an angle defined by the rod 2110 and the workbench 100 can be in other degrees, which is not limited to 90 degrees. Other mounting holes can further be defined on the operating portion 10, so that other angles can be defined between the rod 2100 and the operating surface 104 of the workbench 100.

It should be understood that when the fixture 210 cooperates with the workbench 100, two second clamping surfaces 21301 can cooperate with each other to clamp the external object 300 (not shown in the figures). In some embodiments, referring to FIG. 8 and FIG. 10, the second clamping surface 21301 of the fixture 210 can cooperate with the third clamping surface 51 of the fixing member 50 to clamp the external member 300. In some embodiments, referring to FIG. 9, the second clamping surface 21301 of the fixture 210 can cooperate with the operating surface 104 of the workbench 100 to clamp the external object 300.

Figure 11:
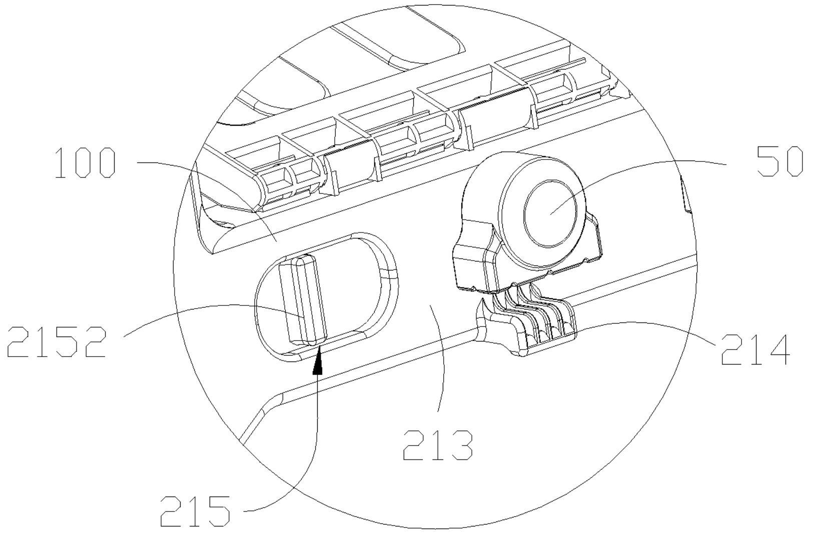
FIG. 11 is an enlarged view of B portion in FIG. 2.

In order to facilitate accommodating the fixing member 50, an accommodating hole 2131 can be defined on the connecting rod 213 in some embodiments. Referring to FIG. 11 and FIG. 19, the fixing member 50 can insert into the accommodating hole 2131 via the mounting member 52. It should be understood that the accommodating hole 2131 can be defined at other positions of the supporting portion 20, as long as the accommodating hole 2131 can accommodate the fixing member 50, which are not limited in the present disclosure.

Referring to FIG. 19 to FIG. 29, the present disclosure further provides a second embodiment which is basically the same with the first embodiments. The differences between the first embodiment and the second embodiment are shown herein: firstly, the second embodiment does not include the first folding portion 101 and the second folding portion 102; secondly, a first accommodating groove 11 of the second embodiment can be disposed on a fixing portion 103; and thirdly, a first locating portion 12 of the second embodiment can have a different structure to the first locating portion 12 of the first embodiment.

The first different and the second difference have been described in detail in paragraphs illustrating the first embodiment, which are not repeated herein. The third difference will be described in details hereinafter.

Figure 22:
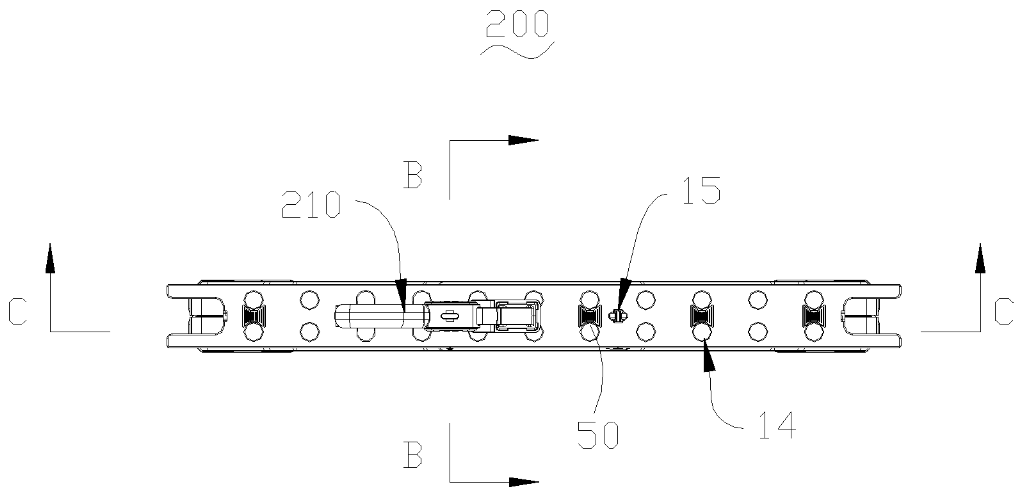
FIG. 22 is a top view of the workbench module in FIG. 21.

Referring to FIG. 19, FIG. 21 and FIG. 22, in the second embodiment, a third mounting hole 15 can be defined on the operating portion 10. The rod 2110 of the fixture 210 can insert into the third mounting hole 15. The rod 2110 can be detachably fixed to the third mounting hole 15, and a first present angle can be defined by the operating surface 104 of the workbench 100 and the rod 2110. The operating surface 104 of the workbench 100 can cooperate with the movable fixture body 2130 of the fixture 210 to clamp an external object 300.

In some embodiments, a shape of the third mounting hole 15 can match with a shape of a cross-section of the rod 2110 to improve stability of the rod 2110 during use.

In some embodiments, the rod 2110 can be perpendicular to the operating surface 104. It should be understood that an angle between the rod 2110 and operating surface 104 of the workbench 100 can be in other degrees, and is not limited to 90 degrees.

Figure 23:
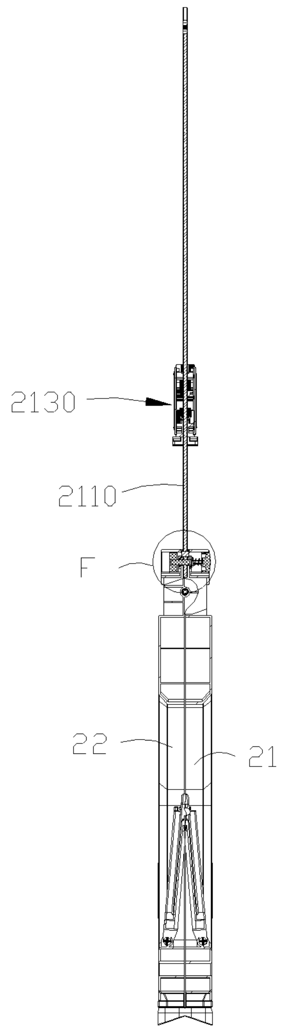
FIG. 23 is a cross-sectional view of the workbench module in FIG. 22 along B-B line.
Figure 24:
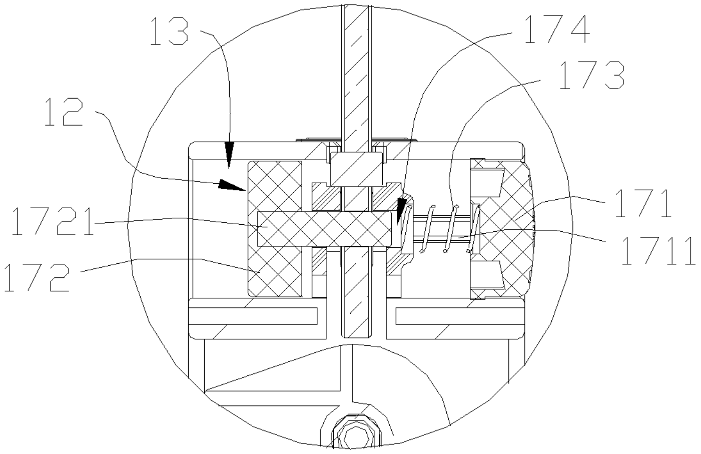
FIG. 24 is an enlarged view of F portion in FIG. 23.
Figure 25:
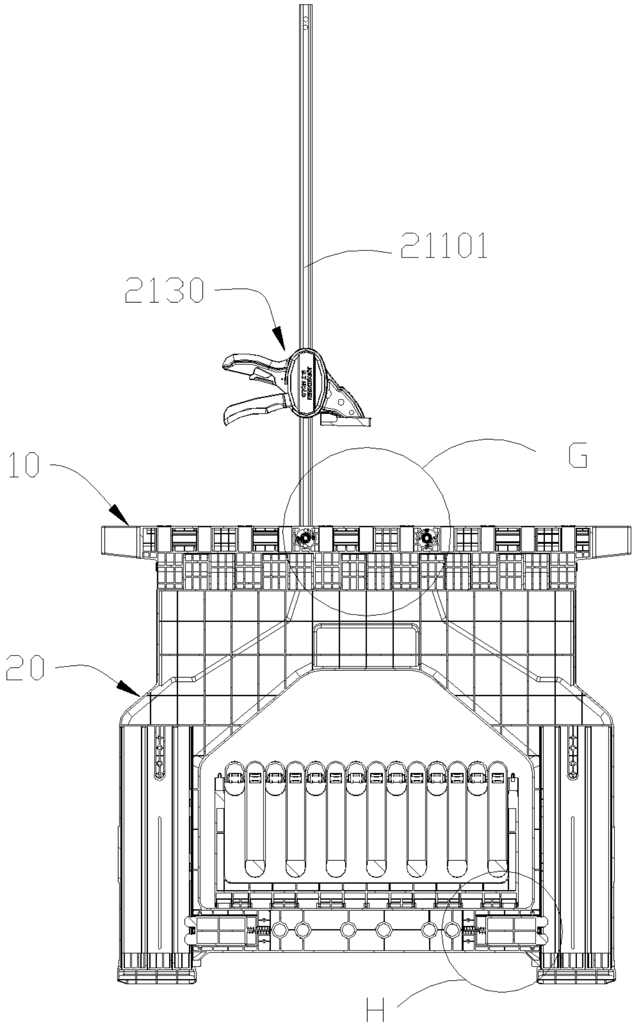
FIG. 25 is a section view of the workbench module in FIG. 22 along C-C line.

Referring to FIG. 19, FIG. 23 and FIG. 24, in order to facilitate fixing the rod 2110, the workbench 100 can include a first locating portion 12. A first mounting hole 13 can be defined on the workbench 100, and the first mounting hole 13 can penetrate through the third mounting hole 15. The rod 2110 can be detachably fixed to the first mounting hole 13 via the first locating portion 12, and the first locating portion 12 can be able to insert into the third mounting hole 15 and prevent the rod 2110 from moving. It should be understood that either the first locating portion 12 in the second embodiment or the first locating portion 12 in the first embodiment can be used in the workbench 100 of the present disclosure, and both of them can fix the rod 2110.

Specifically, in the second embodiment, the first locating portion 12 can include a first pressing member 171, a second pressing member 172 and a third elastic member 173. The first pressing member 171 and the second pressing member 172 can be fixed to each other, and can be accommodated in the third mounting hole 15. Two ends of the third elastic member 173 can abut against the first pressing member 171 and the workbench 100, respectively. A locating column 1721 can be disposed on the second pressing member 172, and a mounting gap 174 can be formed between the locating column 1721 and the first pressing member 171. The first pressing member 171 can be configured for driving the second pressing member 172 to move, resulting in the mounting gap 174 moving to the third mounting hole 15 for the rod 2110 to insert in. A part of the locating column 1721 can insert in the locating hole 21101 of the rod 2110 under an elastic effect of the third elastic member 173, resulting in the rod 2110 being detachably fixed in the first mounting hole 13.

In some embodiments, the first accommodating groove 11, the third mounting hole 15 and the first mounting hole 13 can communicate with each other, and the first locating hole 12 can be configured for locking the rod 2110 to the first accommodating groove 11 or the third mounting hole 15. Furthermore, an axis of the first accommodating groove 11 can be perpendicular to an axis of the third mounting hole 15 and the axis of the first mounting hole 13, and the axis of the third mounting hole 15 can be perpendicular to an axis of the first accommodating groove 11 and the axis of the first mounting hole 13, and the axis of the first mounting hole 13 can be perpendicular to the axis of the first accommodating groove 11 and the axis of the third mounting hole 15.

Figure 26:
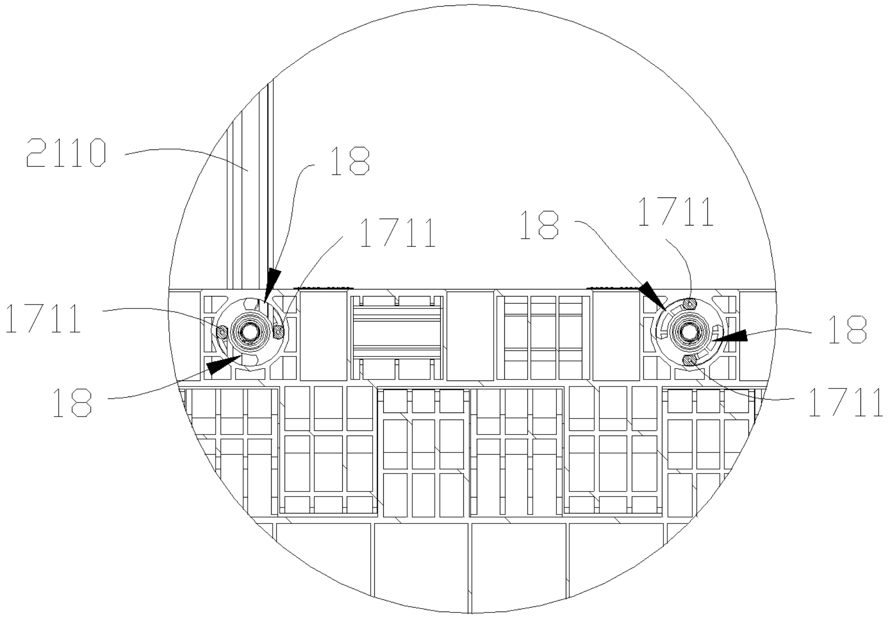
FIG. 26 is an enlarged view of G portion in FIG. 25.

Referring to FIG. 24 and FIG. 26, the first pressing member 171 can be provided with a connecting member, and the first pressing member 171 can be fixed to the second pressing member 172 via the connecting member 1711. The operating portion 10 can include an arc-shaped groove 18, the first pressing member 171 can be able to rotate and drive the connecting member 1711 to rotate in the arc-shaped groove 18 to prevent collisions with the rod 2110. When the rod 2110 is detachably fixed in the first accommodating groove 11, the user can rotate the first pressing member 171 to drive the connecting member 1711 to leave the first accommodating groove 11 and prevent the connecting member 1711 from colliding with the rod 2110. When the rod 2110 is detachably fixed in the third mounting hole 15, the user can rotate the first pressing member 171 to drive the connecting member 1711 from leaving the third mounting hole 15 and prevent the connecting member 1711 from colliding with the rod 2110.

In the present disclosure, when the workbench 100 is used together with a fixture 210, a rod 2110 of the fixture 210 can be detachably accommodated in an accommodating groove 11 to prevent an external object 300 from rubbing against the rod 2110, thereby prolonging a service life of a fixture 210. In the present disclosure, the workbench 100 improves stability of the fixture 210, so that the fixture 210 will not roll over during use. Moreover, since the rod 2110 is fixed to the workbench 100, safety hazards caused by moving the rod 2110 can be decreased. In addition, the user can clamp the external object 300 by merely handling a movable fixture body 2130 of the fixture 210, which is convenient for the user.

The technical features of the above-mentioned embodiments can be combined arbitrarily. In order to make the description concise, all possible combinations of the various technical features in the foregoing embodiments are not described. However, as long as there is no contradiction in the combination of these technical features, it should be regarded as the scope described in this specification.

One of ordinary skill in the art should realize that the above embodiments are only used to illustrate the disclosure, and are not used as a limitation to the disclosure. As long as it is within the scope of the essential spirit of this disclosure, appropriate changes and changes made to the above implementations fall within the scope of protection claimed by this disclosure

I claim:

1. A workbench, comprising an operating portion being configured for a user to process an external object, wherein the operating portion comprises a first accommodating groove configured for detachably fixing a rod of a fixture; the workbench further comprises a first locating portion, which inserts into the first accommodating groove and is configured for limiting the rod to move in the first accommodating groove; the workbench further comprises a first mounting hole penetrating through the first accommodating groove, and the first locating portion comprises a locating pin movable in the first mounting hole and insertable into a locating hole of the rod.

2. The workbench of claim 1, wherein the first locating portion further comprises a first elastic member configured for applying an elastic force on the locating pin, resulting in the locating pin extending into and remaining in the locating hole.

3. The workbench of claim 2, wherein the first locating portion further comprises a limiting sheet sleeved on and fixed to the locating pin, the first elastic member is sleeved on the locating pin, and two ends of the first elastic member abuts against the limiting sheet and the operating portion, respectively; and/or, the first locating portion further comprises an operating member movably connected to an end away from the first accommodating groove of the locating pin, a first groove is located on a sidewall of the workbench, and the first groove is configured for accommodating the operating member.

4. The workbench of claim 1, wherein the workbench comprises the first mounting hole penetrating through the first accommodating groove, the first locating portion comprises a first pressing member, a second pressing member and a third elastic member, the first pressing member and the second pressing member are fixed to each other, and are accommodated in the first mounting hole; two ends of the third elastic member abut against the first pressing member and the workbench, respectively, a locating column is disposed on the second pressing member, and a mounting gap is formed between the locating column and the first pressing member; and the first pressing member is configured for driving the second pressing member to move, resulting in the mounting gap moving to the first accommodating groove for the rod to insert in; and, a part of the locating column inserts in the locating hole of the rod under an elastic effect of the third elastic member, resulting in the rod being detachably fixed in the first mounting hole.

5. The workbench of claim 4, wherein the first pressing member is provided with a connecting member, and the first pressing member is fixed to the second pressing member via the connecting member; the operating comprises an arc-shaped groove, the first pressing member is able to rotate and drive the connecting member to rotate in the arc-shaped groove to prevent collisions with the rod.

6. The workbench of claim 1, wherein the operating portion comprises an operating surface configured for placing the external object, a distance is defined between a side near the operating portion surface of the first accommodating groove and the operating surface; and/or, a second groove is located on a sidewall of the operating, and the second groove is configured for accommodating a movable fixture body of the fixture.

7. The workbench of claim 1, wherein the workbench further comprises a fixing member including a third clamping surface, and the fixing member is disposed on the operating portion, and the third clamping surface of the fixing member can cooperate with a second clamping surface of a movable fixture body of the fixture to clamp the external member.

8. The workbench of claim 7, wherein a mounting member is disposed on the fixing member and protrudes out from the fixing member, a second mounting hole is defined on the operating portion, and the mounting member is able to insert into the second mounting hole.

9. The workbench of claim 8, wherein a plurality of second mounting holes are defined on the operating portion and divided into two sets, and the two sets of the plurality of second mounting holes are located at two sides of the first accommodating groove, respectively; and the two sets of second mounting holes are aligned in pairs with the first accommodating groove as a center line, respectively, and a line defined by two corresponding second mounting holes in a pair is perpendicular to an axis of the first accommodating groove; and/or, the second mounting holes in each of the two sets are evenly distributed along the axis of the first accommodating groove.

10. The workbench of claim 9, wherein two mounting members are disposed on the fixing member and protrude from the fixing member, and the two mounting members inserts into two of the plurality of second mounting holes on two sides of the first accommodating groove, respectively; and/or, one mounting member is disposed on the fixing member and protrudes from the fixing member, and the workbench further comprises two fixing members inserting into two of the plurality of second mounting holes, respectively; and/or, in each of the two sets of the plurality of second mounting holes, a distance between two adjacent second mounting holes of the plurality of second mounting holes is less than or equal to a depth of the second groove.

11. The workbench of claim 8, wherein the workbench comprises an operating surface and a first locating portion configured for detachably fixing the rod to the second mounting hole, and the operating surface of the workbench is perpendicular to the rod; the operating surface of the workbench is able to cooperate with the movable fixture body of the fixture to clamp the external object; and/or, the workbench further comprises a supporting portion configured for supporting the operating, and an accommodating hole is defined on the supporting portion, and the fixing member is able to insert into the accommodating hole via the mounting member.

12. The workbench of claim 1, wherein the operating portion comprises a folding portion and a fixing portion, and the folding portion is rotatably connected to the fixing.

13. The workbench of claim 12, wherein the folding portion comprises a first folding portion and a second folding portion, the first folding portion and the second folding portion are disposed at two sides of the fixing, respectively, and able to fold relative to the fixing, respectively.

14. The workbench of claim 13, wherein the workbench further comprises the supporting portion connected to the fixing portion and configured for supporting the fixing portion; and the workbench further comprises two supporting members, the two supporting members are rotatably connected to the supporting portion, and the two supporting members are configured for supporting the first folding portion and the second folding portion, respectively.

15. The workbench of claim 14, wherein the operating further comprises a first locking member disposed on a side near the supporting portion of the first folding and/or a side near the supporting portion of the second folding, the first locking member is configured for fixing the supporting member to the first folding or the second folding.

16. The workbench of claim 15, wherein the first locking member comprises a mounting portion and a first locking portion, the mounting portion is fixed to the first folding portion or the second folding portion, the first locking portion is movably connected to the mounting portion, and the first locking portion is configured for locking the supporting member between the first folding portion and the first locking portion or between the second folding and the first locking portion.

17. The workbench of claim 14, wherein the operating comprises an operating surface and a back surface separated from each other, a second accommodating groove is defined on the back surface, the supporting member is a U-shaped rod, and two ends of the U-shaped rod are pivotally connected to the supporting portion, respectively, the second accommodating groove is able to accommodate and limit the supporting member, and a middle section of the U-shaped rod is configured for contacting with and supporting the first folding and the second folding.

18. The workbench of claim 17, wherein the supporting portion comprises a first frame body and a second frame body, and both the first frame body and the second frame body are rotatably connected to the fixing; both the first frame body and the second frame body are provided with a mounting frame, and the supporting member is rotatably disposed on the mounting frame; and when the first folding portion and/or the second folding portion is in a folding state, a gap is defined between the first folding portion and the mounting frame and/or between the second folding portion and the mounting frame; and/or, the supporting portion comprises the first frame body and the second frame body, and both the first frame body and the second frame body are rotatably connected to the fixing; both the first frame body and the second frame body comprise a connecting rod and two supporting rods, and the connecting rod is configured for connecting the two supporting rods, the connecting rod comprises a hook portion, and the hook portion is configured for clipping the middle section of the U-shaped rod to prevent the supporting member from rotating towards a direction away from the connecting rod.

19. The workbench of claim 18, wherein the first frame body comprises two the supporting rods, and both of the two supporting rods are telescopic rods the second frame body comprises two the supporting rods, and both of the two supporting rods are telescopic rods.

20. The workbench of claim 14, wherein the supporting portion comprises the first frame body and the second frame body, and both the first frame body and the second frame body are rotatably connected to the fixing; and both the first frame body and the second frame body comprise a connecting rod and two supporting rods, the connecting rod is configured for connecting the two supporting rods; the supporting portion further comprises a first foldable plate and a second foldable plate, a side away from the second foldable plate of the first foldable plate is rotatably connected to the connecting rod of the first frame body, a side away from the first foldable plate of the second foldable plate is rotatably connected to the connecting rod of the second frame body, and the first foldable plate is rotatably connected to the second foldable plate.

21. The workbench of claim 20, wherein both the first foldable plate and the second foldable plate comprise a plurality of axle pin plates and a plurality of axle sleeve plates staggered with each other, the axle pin plate is provided with a pin axle, and the axle sleeve plate is provided with an axle sleeve matching with the pin axle; and the pin axle of the first foldable plate is disposed in the axle sleeve of the second foldable plate, and the pin axle of the second foldable plate is disposed in the axle sleeve of the first foldable plate, resulting in forming a rotatable connection between the first foldable plate and the second foldable plate.

22. The workbench of claim 21, wherein a limiting member is disposed on and protrudes from the pin axle plate, and a limiting hole is defined on the axle sleeve plate, and the limiting member is latched in the limiting hole; and/or, both the first foldable plate and the second foldable plate comprises a peripheral plate, which is located around the axle pin plate and the axle sleeve plate;

the peripheral plate of the first foldable plate is provided with a stopper, and the peripheral plate of the second foldable plate is provided with a limiting groove; or, the peripheral plate of the second foldable plate is provided with the stopper, and the peripheral plate of the first foldable plate is provided with the limiting groove, the limiting groove is configured for accommodating and limiting the stopper, so as to limit a rotation angle defined between the first foldable plate and the second foldable plate.

23. The workbench of claim 1, wherein the workbench comprises an operating surface, a third mounting hole is defined on the operating portion, the workbench is able to fix the rod to the third mounting hole, and a first preset angle is defined by the operating surface of the workbench and the rod; and the operating surface of the workbench and the movable fixture body of the fixture cooperate with each other to clamp the external object.

24. The workbench of claim 23, wherein a shape of the third mounting hole matches with a shape of a cross-section of the rod, and the rod is perpendicular to the operating surface.

25. The workbench of claim 24, wherein a first mounting hole is defined on the workbench, the workbench comprises a first locating portion, and the first mounting hole penetrates through the third mounting hole; and the first locating portion is movably disposed in the first mounting hole, and the first locating portion is able to insert into the third mounting hole and prevent the rod from moving.

26. The workbench of claim 25, wherein the first accommodating groove, the third mounting hole and the first mounting hole communicates with each other, and an axis of the first accommodating groove is perpendicular to an axis of the third mounting hole and the axis of the first mounting hole, and the axis of the third mounting hole is perpendicular to an axis of the first accommodating groove and the axis of the first mounting hole, and the axis of the first mounting hole is perpendicular to the axis of the first accommodating groove and the axis of the third mounting hole; and, the first locating portion is configured for detachably fixing the rod to the first accommodating groove or the third mounting hole.

27. A workbench module, comprising the workbench of claim 1 and the fixture, wherein the fixture comprises the rod and a movable fixture body, the rod is able to be detachably fixed to the workbench, and the movable fixture body is able to move along the rod.

28. The workbench module of claim 27, wherein the fixture is a F-shaped fixture; and/or, the workbench is a carpenter's workbench.

* * * * *